United States Patent
Yan et al.

(10) Patent No.: US 12,010,023 B2
(45) Date of Patent: Jun. 11, 2024

(54) NETWORK CONGESTION HANDLING METHOD AND RELATED APPARATUS

(71) Applicant: HUAWEI TECHNOLOGIES CO., LTD., Shenzhen (CN)

(72) Inventors: Qinghua Yan, Shenzhen (CN); Hewen Zheng, Nanjing (CN); Chao Yin, Nanjing (CN); Heyang Liu, Nanjing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 8 days.

(21) Appl. No.: 17/563,167

(22) Filed: Dec. 28, 2021

(65) Prior Publication Data

US 2022/0124036 A1 Apr. 21, 2022

Related U.S. Application Data

(63) Continuation of application No. PCT/CN2020/099204, filed on Jun. 30, 2020.

(30) Foreign Application Priority Data

Jul. 24, 2019 (CN) ............ 201910673706.7
Sep. 25, 2019 (CN) ............ 201910913827.4

(51) Int. Cl.
*H04L 47/12* (2022.01)
*H04L 47/10* (2022.01)

(52) U.S. Cl.
CPC ............ *H04L 47/12* (2013.01); *H04L 47/29* (2013.01)

(58) Field of Classification Search
None
See application file for complete search history.

(56) References Cited

U.S. PATENT DOCUMENTS 7,675,857 B1  3/2010 Chesson
10,015,096 B1  7/2018 Singh
(Continued)

FOREIGN PATENT DOCUMENTS

CN  103907323 A  7/2014
CN  104836743 A  8/2015
(Continued)

OTHER PUBLICATIONS

Mohammad Al-Fares et al.,"A scalable, commodity data center network architecture", ACM SIGCOMM Computer Communication Review,vol. 38,Issue 4,Oct. 2008,total 12 pages.

(Continued)

*Primary Examiner* — Jason E Mattis
*Assistant Examiner* — Bao G Nguyen
(74) *Attorney, Agent, or Firm* — Rimon PC

(57) ABSTRACT

In a network congestion handling method, a first network device determines a target port, where the target port is an egress port that is in a pre-congestion state or a congestion state. The first network device sends a first notification to at least one second network device. The at least one second network device is capable of sending, through at least two forwarding paths, a data flow to a host corresponding to the target port. The first notification includes information of a network device to which the target port belongs and information of the target port. The first notification can enable the at least one second network device to perform an operation of avoiding network congestion. The network congestion handling method can effectively alleviate network congestion and improve network bandwidth utilization.

19 Claims, 14 Drawing Sheets

(56) References Cited

U.S. PATENT DOCUMENTS

| | | | | |
|---|---|---|---|---|
| 10,812,391 | B1* | 10/2020 | Shmilovici Leib ... | H04L 47/125 |
| 2007/0223372 | A1* | 9/2007 | Haalen .................... | H04L 47/10 |
| | | | | 370/229 |
| 2012/0092988 | A1* | 4/2012 | Zhou ....................... | H04L 47/70 |
| | | | | 370/230 |
| 2012/0233349 | A1* | 9/2012 | Aybay ................. | H04L 47/2441 |
| | | | | 709/234 |
| 2017/0048144 | A1 | 2/2017 | Liu | |
| 2020/0044976 | A1* | 2/2020 | Chang .................... | H04L 49/90 |

FOREIGN PATENT DOCUMENTS

| | | |
|---|---|---|
| CN | 109981471 A | 7/2019 |
| EP | 2950489 A1 | 12/2015 |

OTHER PUBLICATIONS

K. Ramakrishnan et al., "The Addition of Explicit Congestion Notification (ECN) to IP", Request for Comments: 3168, Network Working Group,Sep. 2001,total 63 pages.

M. Mahalingam et al., "Virtual extensible Local Area Network (VXLAN): A Framework for Overlaying Virtualized Layer 2 Networks over Layer 3 Networks",Request for Comments: 7348,Independent Submission,Aug. 2014,total 22 pages.

* cited by examiner

NETWORK CONGESTION HANDLING METHOD AND RELATED APPARATUS

CROSS-REFERENCE TO RELATED APPLICATIONS

This application is a continuation of International Application No. PCT/CN2020/099204 filed on Jun. 30, 2020, which claims priority to Chinese Patent Application No. 201910673706.7 filed on Jul. 24, 2019, and to Chinese Patent Application No. 201910913827.4 filed on Sep. 25, 2019. All of the aforementioned patent applications are hereby incorporated by reference in their entireties.

TECHNICAL FIELD

This application relates to the field of network communications technologies, and in particular, to a network congestion handling method and related apparatus.

BACKGROUND

When the amount of data carried by a network node or carried on a link in a network exceeds the amount of data that can be processed by the network node or the link, network congestion occurs. The impact of network congestion includes transmission delay, packet loss, or failure to set up a new connection. Severe network congestion may lead to network failure.

A plurality of congestion control technologies are used to avoid network failure. For example, when network congestion occurs, a received data packet may be discarded or rearranged, a TCP congestion avoidance algorithm may be used to implement congestion control, and an explicit congestion notification (Explicit Congestion Notification) mechanism may be used to adjust a transmit rate of a transmit end.

In a scenario in which a network experiences explosive traffic growth, how to provide a more efficient congestion control technology is an urgent problem to be solved in this field.

SUMMARY

This application provides a network congestion handling method and a related apparatus, to effectively avoid network congestion and improve network bandwidth utilization.

A first aspect of this application provides a network congestion handling method. In the method, a first network device determines a target port, where the target port is an egress port that is in a pre-congestion state or a congestion state. The first network device sends a first notification to at least one second network device. The at least one second network device is capable of sending, through at least two forwarding paths, a data flow to a host corresponding to the target port. The first notification includes information of a network device to which the target port belongs and information of the target port. The at least one second network device is determined based on a role of the first network device, an attribute of the target port, and a role of the network device to which the target port belongs.

In the foregoing method in this application, when an egress port that is in the pre-congestion state or the congestion state exists in a network, the first network device notifies the egress port to the second network device in the network. The second network device may learn of information of the egress port, and avoid sending a packet to a forwarding path including the egress port when forwarding the packet subsequently, to avoid network congestion.

Optionally, when the network device to which the target port belongs is the first network device, the first network device monitors the egress port of the first network device. When a buffer usage of one of the egress ports of the first network device exceeds a port buffer threshold, the first network device determines that the egress port is the target port.

Optionally, when the network device to which the target port belongs is the first network device, the first network device monitors egress port queues of the first network device. When the length of one of the egress port queues of the first network device exceeds a queue buffer threshold, the first network device determines that an egress port corresponding to the egress port queue whose length exceeds the threshold is the target port.

In this application, whether the egress port is in the congestion state or the pre-congestion state may be determined based on the buffer usage of the egress port, or whether the egress port is in the congestion state or the pre-congestion state may be determined based on a length of an egress port queue on the egress port, so that network congestion can be flexibly notified and handled.

Optionally, the network device to which the target port belongs is a third network device. The first network device receives a second notification sent by the third network device, where the second notification includes information of the third network device and the information of the target port. The first network device determines the target port based on the second notification.

In this application, the first network device further receives a notification sent by another network device, to learn of information of a port that is discovered by the another network device and that is in the pre-congestion state or the congestion state. In this way, network congestion can be processed in an entire network.

Optionally, the information of the network device to which the target port belongs includes an identifier of the network device to which the target port belongs, and the information of the target port includes an identifier of the target port or an identifier of a forwarding path on which the target port is located. Alternatively, the information of the network device to which the target port belongs further includes the role of the network device to which the target port belongs, and the role indicates a location of the network device to which the target port belongs. The information of the target port further includes the attribute of the target port, and the attribute indicates a direction in which the target port sends a data flow.

The notification in this application may include various types of information, to adapt to different types of network architectures, thereby improving the applicability of the technical solution.

Optionally, before the first network device sends the first notification to the at least one second network device, the first network device further determines that no idle egress port capable of forwarding a target data flow corresponding to the target port exists on the first network device. The target data flow is a data flow corresponding to a target address range. The target address range is an address range corresponding to the host corresponding to the target port, and the target address range is determined based on the information of the network device to which the target port belongs and the information of the target port.

In this application, the first network device preferably forwards the target data flow through the idle egress port on the first network device, so that the frequency of switching the target data flow can be reduced, and the impact of switching a forwarding path of the target data flow on another network device can be reduced.

Optionally, the information of the target port may further include an identifier of a target egress port queue. The target egress port queue is an egress port queue that is in the congestion state or the pre-congestion state in the target port. The target data flow is a data flow that corresponds to the target address range and whose priority corresponds to an identifier of the egress port queue.

In this application, the steps for avoiding network congestion may be performed only on a data flow corresponding to an egress port queue that is in a pre-congestion state or a congestion state, so that the impact on another data flow can be reduced while network congestion is avoided.

Optionally, the first network device stores the information of the network device to which the target port belongs and the information of the target port. Further, the first network device may store a state of the target port.

Further, the first network device sets an aging time for the stored information. In this way, when receiving a subsequent data flow, the first network device may process the received data flow based on the stored information, to avoid sending the data flow to the forwarding path on which the target port is located, thereby alleviating network congestion.

A second aspect of this application provides a network congestion handling method. A second network device receives a first notification from a first network device. The first notification includes information of a network device to which a target port belongs and information of the target port. The target port is a port that is in a pre-congestion state or a congestion state. The second network device is a network device capable of sending, through at least two forwarding paths, a data flow to a host corresponding to the target port. The second network device determines a target data flow, where a first forwarding path of the target data flow includes the target port. The second network device determines whether an idle egress port capable of forwarding the target data flow exists on the second network device, to obtain a result of the determining. The second network device processes the target data flow based on the result of the determining.

In this application, the second network device processes the target data flow based on the received first notification including the information of the target port that is in the pre-congestion state or the congestion state, to avoid sending the target data flow to a forwarding path on which the target port is located, thereby avoiding network congestion.

Optionally, when an idle egress port capable of forwarding the target data flow exists on the second network device, the second network device sends the target data flow through the idle egress port. A second forwarding path on which the idle egress port is located does not include the target port.

The second network device forwards the target data flow through the idle egress port on the second network device, to avoid propagating the information of the target port to another network device, thereby preventing network oscillation.

Optionally, when no idle egress port capable of forwarding the target data flow exists on the second network device, the second network device sends the target data flow through the first forwarding path. Further, the second network device generates a second notification. The second notification includes the information of the network device to which the target port belongs and the information of the target port. The second network device sends the second notification to at least one third network device. The at least one third network device is capable of sending, through at least two forwarding paths, a data flow to the host corresponding to the target port.

In this application, when no idle egress port capable of forwarding the target data flow exists on the second network device, the second network device forwards the target data flow through the first forwarding path, so that a loss of a received data flow can be avoided. Further, the second network device propagates the information of the target port to the third network device by using the second notification. After receiving the second notification, the third network device may perform handling for avoiding network congestion, to alleviate network congestion.

Optionally, when the second network device is directly connected to a source host of the target data flow, the second network device further sends a backpressure message to the source host of the target data flow. The backpressure message is used to enable the source host to perform an operation of handling network congestion.

The second network message sends the backpressure message to the source host of the target data flow, to prevent excessive data flows from entering a network at source, thereby avoiding network congestion.

Optionally, the second network device determines a target address range based on the information of the network device to which the target port belongs and the information of the target port, where the target address range is an address range corresponding to the host corresponding to the target port. The second network device determines a data flow whose destination address belongs to the target address range as the target data flow.

Optionally, the first notification further includes an identifier of a target egress port queue, and the target egress port queue is an egress port queue that is in the pre-congestion state or the congestion state in the target port. The second network device determines, as the target data flow, a data flow whose destination address belongs to the target address range and whose priority corresponds to an identifier of the egress port queue.

Optionally, the second network device stores the information of the network device to which the target port belongs and the information of the target port. Further, the second network device may store a state of the target port.

A third aspect of this application provides a network device for handling network congestion is provided. The network device includes a plurality of functional modules that perform the network congestion handling method provided in the first aspect or any one of possible designs of the first aspect. The manner of division into the plurality of functional modules is not limited in this application. Division into the plurality of functional modules may be correspondingly performed based on procedure steps of the network congestion handling method in the first aspect, or division into the plurality of functional modules may be performed based on specific implementation requirements. The plurality of functional modules may be hardware or software modules, and the plurality of functional modules may be deployed on a same physical device, or may be deployed on different physical devices.

A fourth aspect of this application provides a network device for handling network congestion. The network device includes a plurality of functional modules that perform the network congestion handling method provided in the second aspect or any one of possible designs of the second aspect. Division into the plurality of functional modules is not limited in this application. Division into the plurality of functional modules may be correspondingly performed based on procedure steps of the network congestion handling method in the second aspect, or division into the plurality of functional modules may be performed based on specific implementation requirements. The plurality of functional modules may be hardware or software modules, and the plurality of functional modules may be deployed on a same physical device, or may be deployed on different physical devices.

A fifth aspect of this application provides another network device for handling network congestion. The network device includes a memory and a processor. The memory is configured to store program code, and the processor is configured to invoke the program code, to implement the network congestion handling method in the first aspect of this application and any possible design of the first aspect, and implement the network congestion handling method in the second aspect of this application and any possible design of the second aspect.

A sixth aspect of this application provides a chip. The chip can implement the network congestion handling method in the first aspect of this application and any possible design of the first aspect, and implement the network congestion handling method in the second aspect of this application and any possible design of the second aspect.

A seventh aspect of this application provides a storage medium. The storage medium stores program code. When the program code is run, a device (a switch, a router, a server, or the like) that runs the program code can implement the network congestion handling method in the first aspect of this application and any possible design of the first aspect, and implement the network congestion handling method in the second aspect of this application and any possible design of the second aspect.

An eighth aspect of this application provides a data center network. The data center network includes a first network device and a second network device. The first network device is configured to implement the network congestion handling method in the first aspect of this application and any possible design of the first aspect, and the second network device is configured to implement the network congestion handling method in the second aspect of this application and any possible design of the second aspect.

For beneficial effects of the third aspect to the eighth aspect of this application, refer to the descriptions of the beneficial effects of the first aspect and the second aspect and the possible designs of the first aspect and the second aspect. Details are not described herein again.

DESCRIPTION OF EMBODIMENTS

Embodiments of this application provide a network congestion handling method and related apparatus, which can be applied to a system including a plurality of network devices. The following describes the embodiments of this application in detail with reference to the accompanying drawings.

Figure 1:
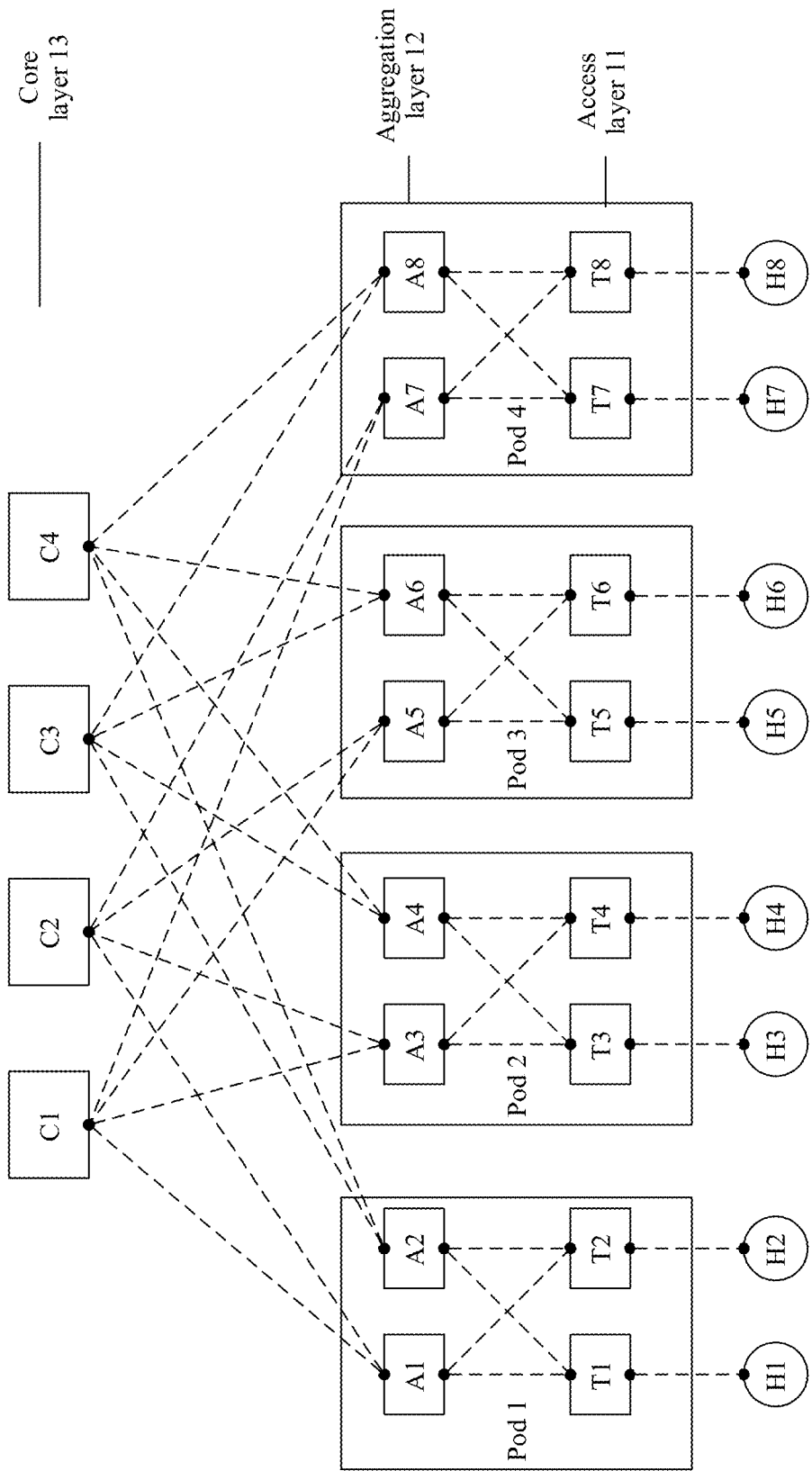
FIG. 1 is a schematic structural diagram of a network system according to an embodiment of this application.

FIG. 1 is a schematic structural diagram of a network system according to an embodiment of this application. The network system uses a Clos architecture. The network system includes an access layer 11, an aggregation layer 12, and a core layer 13. The access layer 11 includes a plurality of access devices T1 to T8, the aggregation layer 12 includes a plurality of aggregation devices A1 to A7, and the core layer 13 includes a plurality of core devices C1 to C4. Each access device is connected to one or more hosts Hx. The Clos architecture in FIG. 1 is a multi-plane architecture. Multi-plane means that there are a plurality of core device groups, and each aggregation device is connected to the core devices in the same core device group. For example, in FIG. 1, there are a core device group (C1, C2) and a core device group (C3, C4). The core device group (C1, C2) includes the core devices C1 and C2, and the core device group (C3, C4) includes the core devices C3 and C4. Each core device group and the aggregation devices connected to the core device group form one forwarding plane. For example, the core device group (C1, C2) and the aggregation devices A1, A3, A5, and A7 form one forwarding plane, and the core device group (C3, C4) and the aggregation devices A2, A4, A6, and A8 form one forwarding plane. Optionally, in FIG. 1, the access devices and the aggregation devices may further form different points of delivery (pod). Each pod includes a specific quantity of access devices and a specific quantity of aggregation devices, and an access device in a pod is connected to all aggregation devices in the same pod. For example, the pod 1 includes the aggregation devices A1 and A2, the access device T1 in the pod 1 is connected to the aggregation devices A1 and A2, and the access device T2 is also connected to the aggregation devices A1 and A2. Each core device at the core layer is connected to all pods. In this application, FIG. 1 shows a plurality of pods to describe a connection relationship between devices. For brevity, pods are not drawn in subsequent accompanying drawings related to a Clos network. Further, the multi-plane Clos architecture in FIG. 1 may be replaced with a single-plane Clos architecture, that is, each core device is connected to all aggregation devices. The access device in this application may be a switch, and the aggregation device and the core device may be switches or routers.

Figure 2:
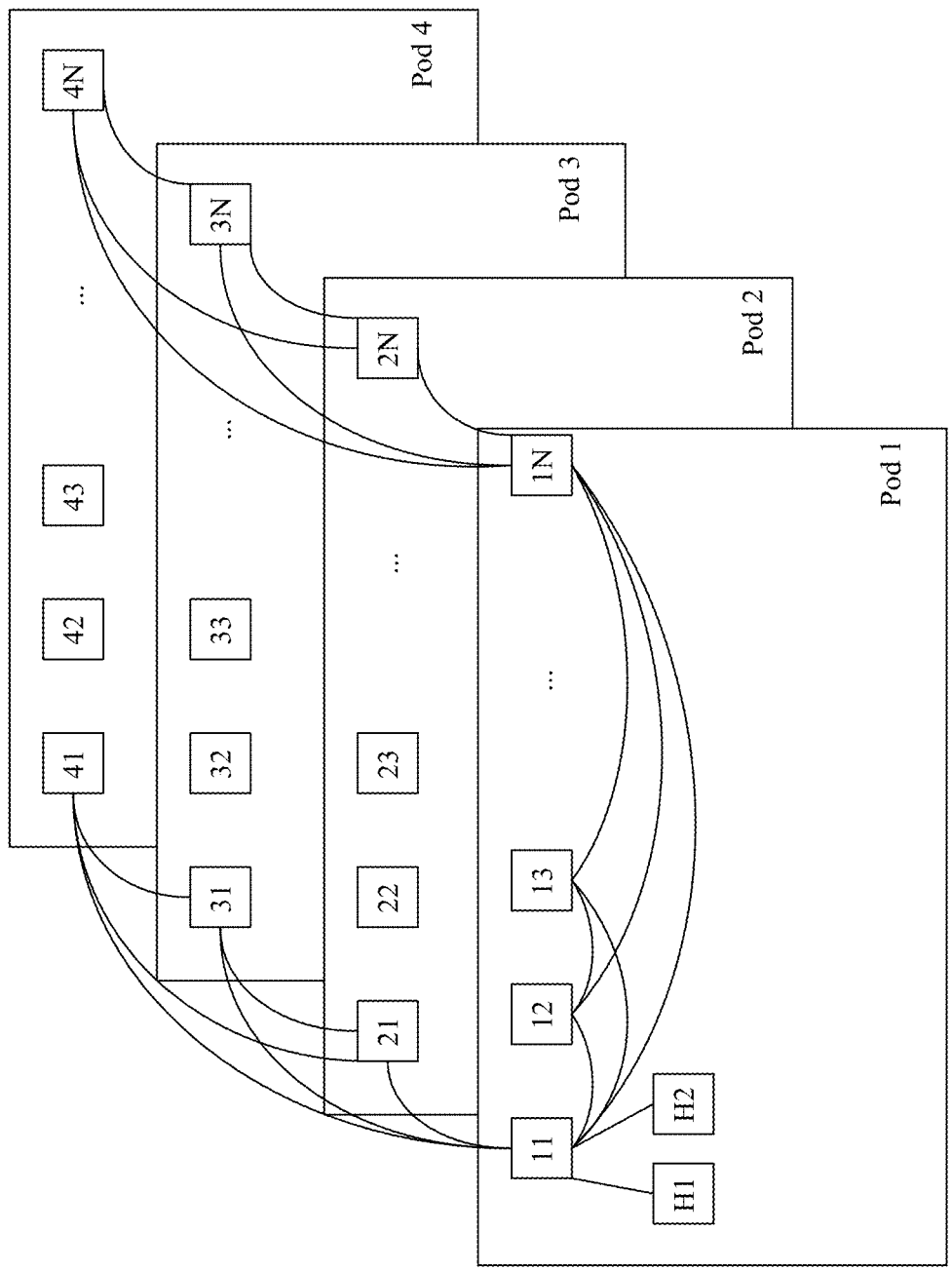
FIG. 2 is a schematic structural diagram of another network system according to an embodiment of this application.

FIG. 2 is a schematic structural diagram of another network system according to an embodiment of this application. As shown in FIG. 2, the network architecture includes a plurality of switch groups (four switch groups are shown in FIG. 2). Each switch group may be referred to as a pod. Each switch group (pod) includes N switches. The number (identifier) of each switch uses a format of xy, where x indicates the pod to which the switch belongs, and y indicates the number of the switch in the pod to which the switch belongs. For example, in FIG. 2, the pod 1 includes switches 11, 12, 13, . . . , and 1N; the pod 2 includes switches 21, 22, 23, . . . , and 2N; a pod 3 includes switches 31, 32, 33, . . . , and 3N; and the pod 4 includes switches 41, 42, 43, . . . , and 4N. Every two of N switches in each switch group are directly connected. Each switch is directly connected to a corresponding switch in another pod to form N inter-group planes. The corresponding switch refers to a switch with the same number (identifier) in a different switch group. For example, the switches 11, 21, 31, and 41 are corresponding switches. In addition, the switches 11, 21, 31, and 41 are interconnected to form an inter-group plane on the left of FIG. 2, and the switches 1N, 2N, 3N, and 4N are interconnected to form an inter-group plane on the right of FIG. 2. The direct connection means that there is no network device such as another switch or router between two switches, but there may be a device configured to provide a connection or a device configured to enhance a signal. Ports for connecting switches in different switch groups are referred to as inter-group ports, and ports for connecting switches in a same switch group are referred to as intra-group ports. Switches in one pod have the same configuration or specifications. Each pod forms one intra-group plane. Further, each switch shown in FIG. 2 is further connected to one or more hosts. FIG. 2 shows only hosts H1 and H2 corresponding to the switch 11.

Figure 3:
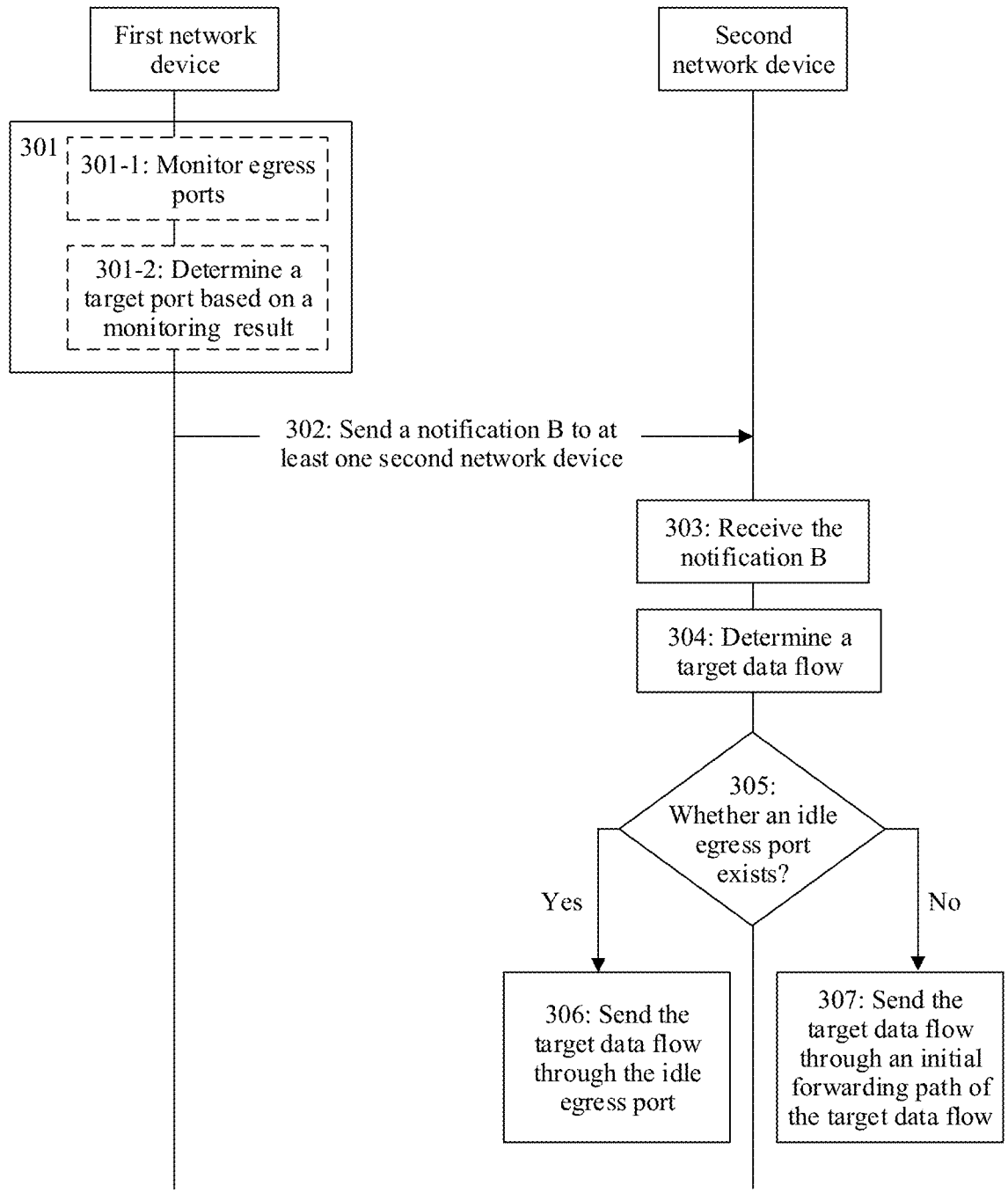
FIG. 3 is a flowchart of a network congestion handling method according to an embodiment of this application.

Based on the network system shown in FIG. 1 or FIG. 2, this application provides a network congestion handling method as shown in FIG. 3. The method is implemented by a first network device and a second network device in cooperation. The first network device may be any device in FIG. 1 or FIG. 2, and the second network device may be determined by the first network device, or may be preconfigured. The following describes the method with reference to FIG. 3.

In step 301, the first network device determines a target port.

The target port is an egress port that is in a congestion state or a pre-congestion state. The pre-congestion state is a state in which congestion is about to occur but has not yet occurred.

In an implementation, the target port is an egress port of the first network device, and step 301 may include 301-1 and 301-2.

In step 301-1, the first network device monitors egress ports of the first network device. In this application, the first network device may be any network device. When the first network device forwards a packet, the to-be-sent packet enters an egress port queue of an egress port. Each egress port corresponds to a plurality of (for example, eight) egress port queues. That the first network device monitors egress ports of the first network device may comprise monitoring each egress port of the first network device, or may be monitoring each egress port queue of the first network device. For example, the first network device monitors whether a buffer usage of each egress port exceeds a first threshold, or the first network device monitors whether a length of each egress port queue exceeds a second threshold. The first threshold indicates an occupied proportion or a quantity of used bytes of a buffer of one egress port, and may also be referred to as a port buffer threshold. The second threshold indicates an occupied proportion or a quantity of used bytes in a buffer of one egress port queue, and may also be referred to as a queue buffer threshold.

In step 301-2, the first network device determines the target port based on a monitoring result.

Optionally, when a buffer usage of one of the egress ports exceeds the first threshold, the first network device determines the egress port as the target port. The first threshold may be a pre-congestion threshold or a congestion threshold. When the buffer usage of the egress port exceeds the pre-congestion threshold, the egress port is in the pre-congestion state. When the buffer usage of the egress port exceeds the congestion threshold, the egress port is in the congestion state.

Optionally, when a length of one egress port queue exceeds the second threshold, the first network device determines that an egress port corresponding to the egress port queue is the target port. The egress port queue may be referred to as a target egress port queue. The first network device allocates a buffer zone to each egress port queue. A maximum length of an egress port queue is the size of a buffer allocated to the egress port queue. When a packet enters the buffer zone corresponding to the egress port queue, the amount of data stored in the buffer zone is the length of the egress port queue. The second threshold may be a length (a quantity of bytes) or a proportion. For example, a maximum length of an egress port queue A is 2 MB, and the second threshold is 70%. If the amount of data stored in a buffer zone of the egress port queue A reaches or exceeds 1.4 MB, it may be determined that the egress port queue A is in a pre-congestion state or a congestion state (which is determined according to a setting). The first network device determines that an egress port corresponding to the egress port queue A is the target port. In another implementation, the first network device is not a network device to which the target port belongs, and step 301 includes: The first network device receives a notification A sent by a third network device. The third network device is the network device to which the target port belongs. The notification A includes information of the third network device and information of the target port. The first network device determines the target port based on the information of the target port in the notification A. Further, the notification A may further include an identifier of an egress port queue that is in the pre-congestion state or the congestion state in the target port.

Optionally, after determining the target port, the first network device further stores congestion information. The congestion information includes the information of the target port and the information of the network device to which the target port belongs. The congestion information may further include a state of the target port, so that when a data flow is subsequently received, the data flow is processed based on the congestion information. Further, the first network device sets an aging time for the congestion information, and deletes the congestion information when the aging time expires.

In step 302, the first network device sends a notification B to at least one second network device. The notification B includes the information of the network device to which the target port belongs and the information of the target port.

Optionally, the notification B may further include a type of the notification B, and the type is used to indicate that the target port identified in the notification B is a port that is in a pre-congestion state or a congestion state. Optionally, the information of the target port in the notification B includes the state of the target port, and the state includes a pre-congestion state or a congestion state. Optionally, the notification B further includes an identifier of an egress port queue that is in the congestion state or the pre-congestion state in the target port. In this application, the information of the network device to which the target port belongs and the information of the target port that are included in the notification B are collectively referred to as the congestion information.

The first network device may send the notification B to the at least one second network device in a multicast mode, or may send the notification B to each of the at least one second network device in a unicast mode.

In an implementation, the information of the network device to which the target port belongs includes an identifier of the network device, and the information of the target port includes an identifier of the target port or an identifier of a path on which the target port is located. The identifier of the path on which the target port is located may be an identifier of a network device on a forwarding path on which the target port is located. In another implementation, the information of the network device to which the target port belongs includes the identifier of the network device and a role of the network device, and the information of the target port includes the identifier of the target port and an attribute of the target port.

The at least one second network device may be preconfigured, or may be determined by the first network device according to a preset rule. The at least one second network device includes one or more network devices capable of sending, through at least two forwarding paths, a data flow to a host corresponding to the target port. Alternatively, the at least one second network device includes one or more network devices that are capable of sending, through at least two forwarding paths, a data flow to a host corresponding to the target port and that have a smallest hop count to the network device to which the target port belongs. The host corresponding to the target port is a near-end host that can receive a data flow through the target port. The at least one second network device is determined based on the role of the network device to which the target port belongs, the attribute of the target port, and a role of the first network device. The attribute of the target port indicates a forwarding direction of a data flow in the target port, and the role of the network device indicates a location of the network device in the network system.

Figure 6:
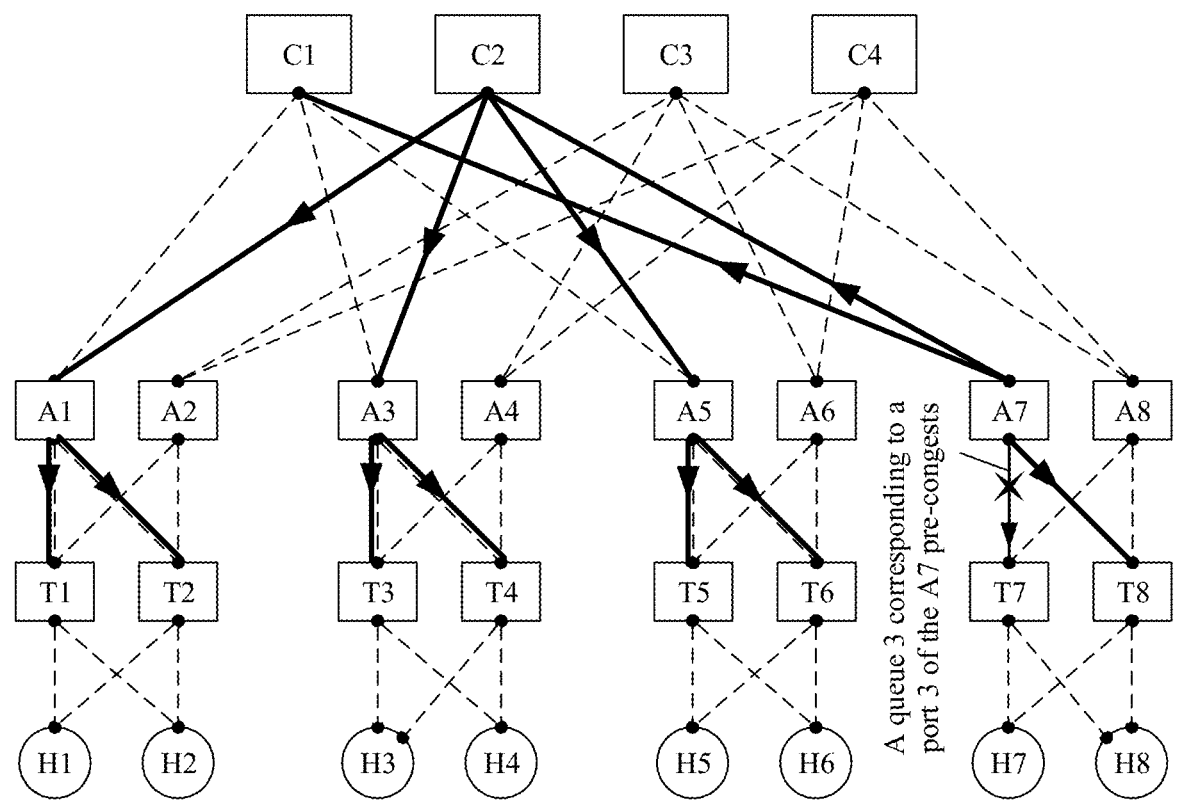
FIG. 6 is a schematic diagram of a processing procedure performed when a target port is a downlink port of an aggregation device in a multi-plane Clos architecture.
Figure 7:
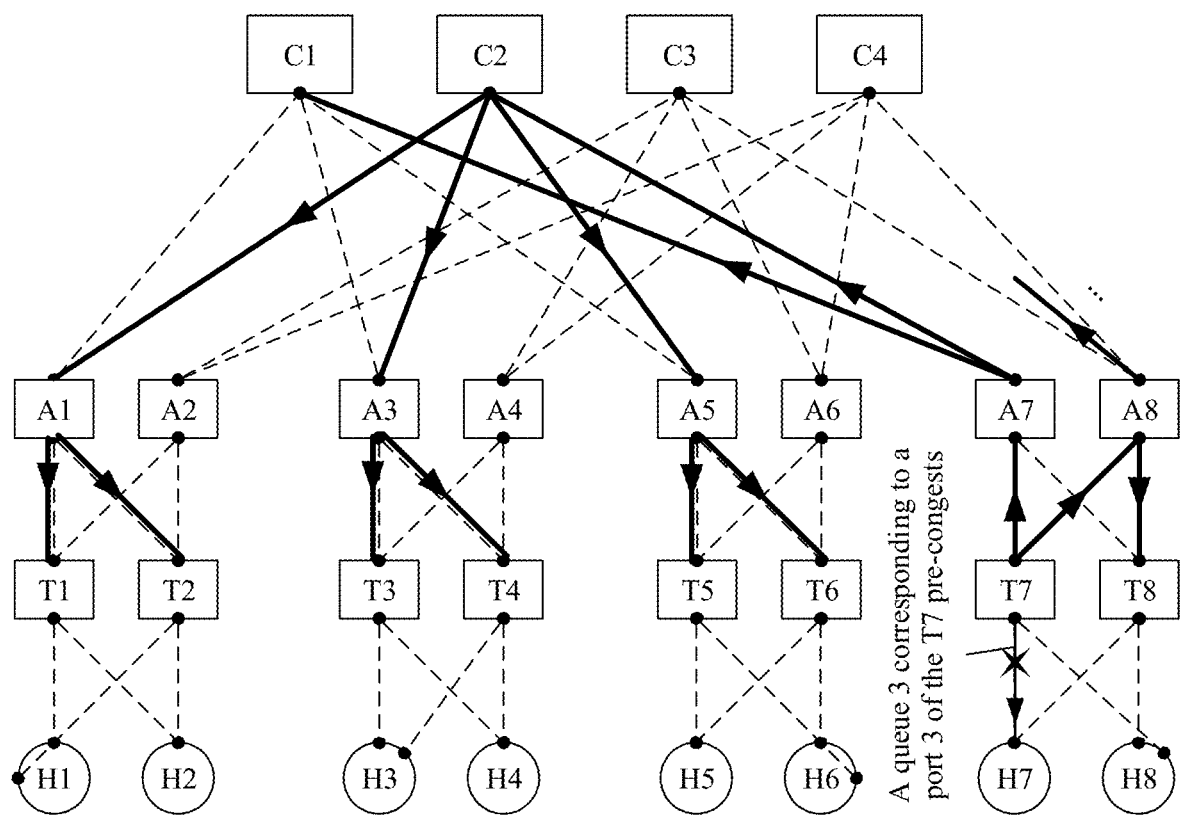
FIG. 7 is a schematic diagram of a processing procedure performed when a target port is a downlink port of an access device in a multi-plane Clos architecture.
Figure 8:
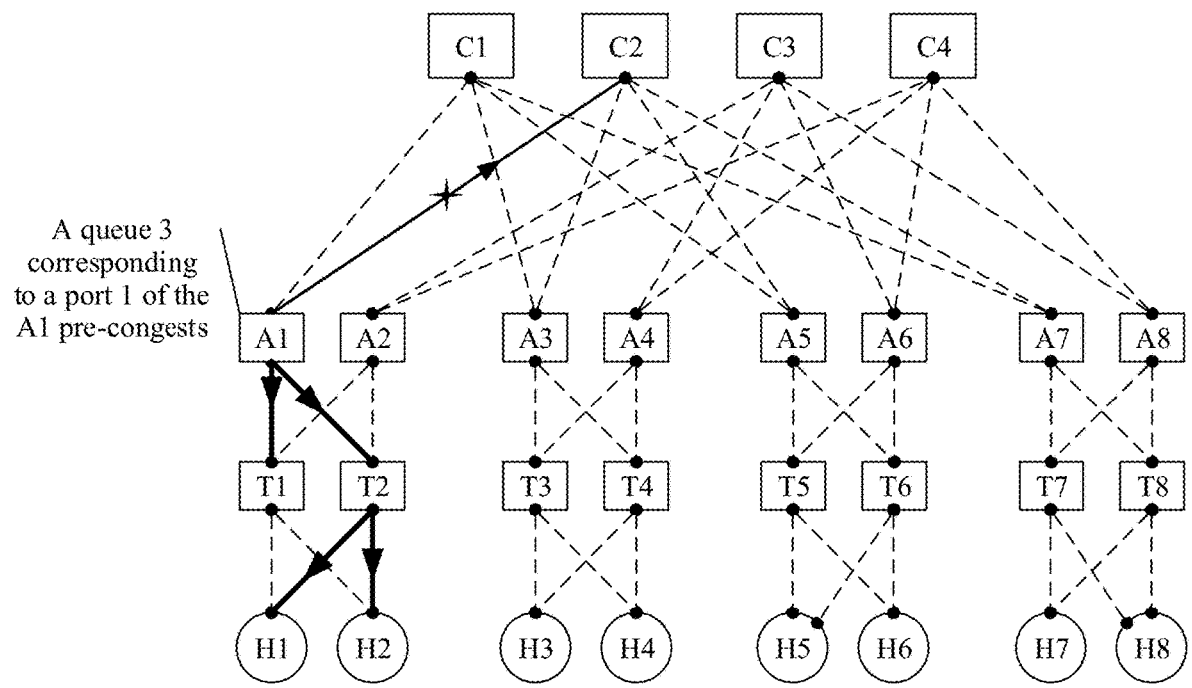
FIG. 8 is a schematic diagram of a processing procedure performed when a target port is an uplink port of an aggregation device in a multi-plane Clos architecture.
Figure 9:
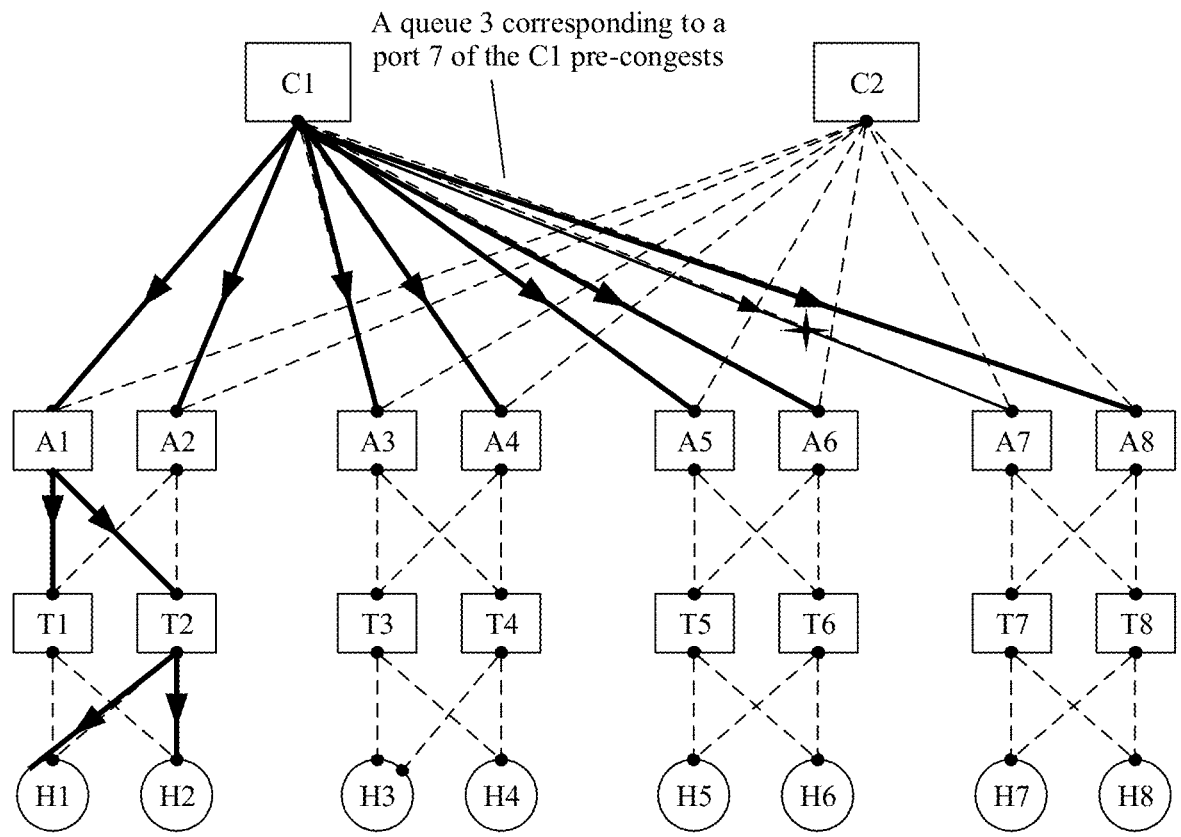
FIG. 9 is a schematic diagram of a processing procedure performed when a target port is a downlink port of a core device in a single-plane Clos architecture.
Figure 10:
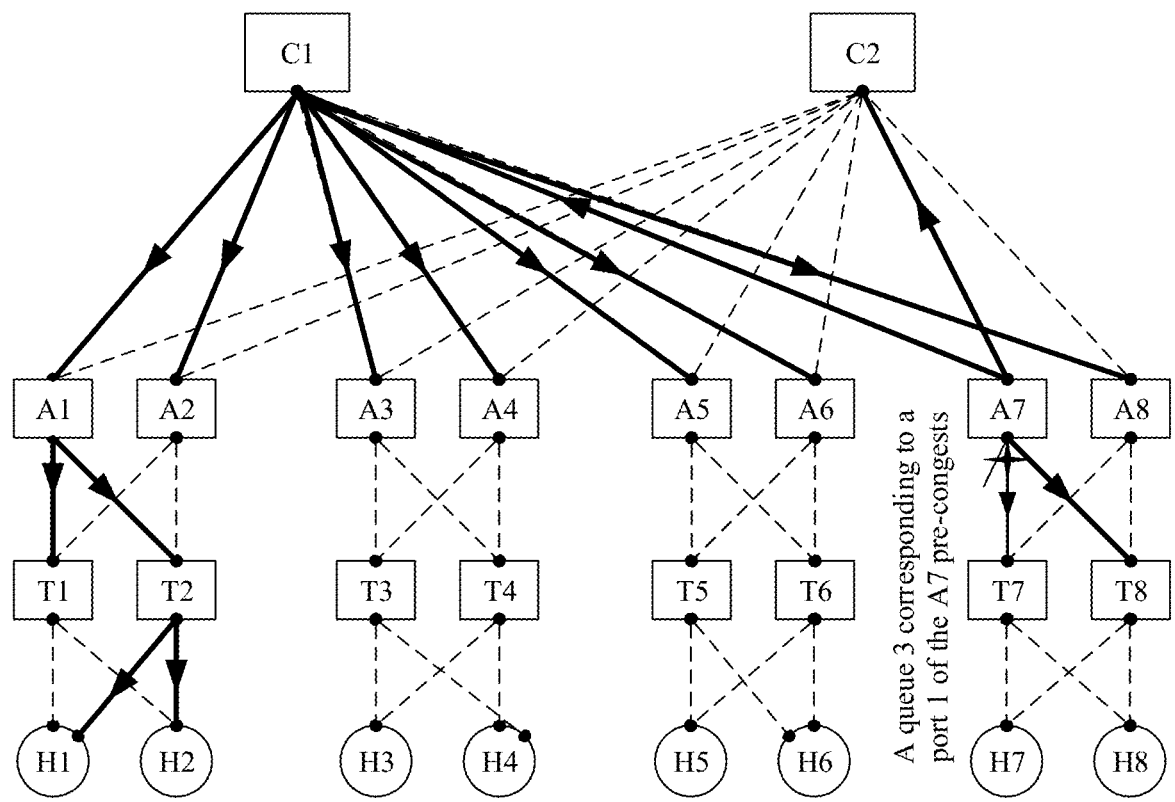
FIG. 10 is a schematic diagram of a processing procedure performed when a target port is a downlink port of an aggregation device in a single-plane Clos architecture.

In the network system shown in FIG. 1, the role of a network device may be an access device, an aggregation device, or a core device. An attribute of a port includes an uplink/downlink port. A port on the access device connected to the aggregation device and a port on the aggregation device connected to the core device are uplink ports. A port on the core device connected to the aggregation device and a port on the aggregation device connected to the access device are downlink ports. In the network system shown in FIG. 1, a near-end host with respect to a specific device is a host that when the device sends a data packet to the host, the data packet does not cross or go through a core device. For example, in FIG. 4, near-end hosts corresponding to a port 4 of a core device C2 are hosts connected to access devices T7 and T8. In FIG. 6, near-end hosts corresponding to a port 3 of an aggregation device A7 are hosts connected to access devices T7 and T8. In FIG. 7, a near-end host corresponding to a port 3 of an access device T7 is a host connected to the access device T7. In FIG. 8, near-end hosts corresponding to a port 1 of an aggregation device A1 are hosts connected to access devices T1 and T2. In FIG. 9, near-end hosts connected to a port 7 of a core device C1 are hosts connected to access devices T7 and T8. In FIG. 10, a near-end host corresponding to a port 1 of an access device T7 is a host connected to the access device T7.

In the network system shown in FIG. 2, an attribute of a port includes an intra-group port or an inter-group port. A port for connecting switches in a same switch group is referred to as an intra-group port, for example, a port for connecting the switch 11 and the switch 12. A port for connecting switches in different switch groups is referred to as the inter-group port, for example, a port for connecting the switch 1N and the switch 2N. A role of a network device may be an intra-group switch or an inter-group switch. Switches belonging to a same switch group are intra-group switches, and two switches belonging to different switch groups are inter-group switches. For example, the switches 11, 12, . . . , and 1N in the pod 1 are intra-group switches, and the switch 1N in the pod 1 and the switch 2N in the pod 2 are inter-group switches. In the network system shown in FIG. 2, a near-end host is a host connected to a switch that is directly connected to a target port. For example, in FIG. 11, near-end hosts corresponding to a port 3 of a switch 3N are hosts 34 connected to a switch 33. In FIG. 12, near-end hosts corresponding to a port 2 of a switch 1N are hosts connected to a switch 2N. Before step 302, the first network device may further determine whether an idle egress port capable of forwarding a target data flow exists on the first network device. When no idle egress port is available, step 302 is performed. When an idle egress port is available, the first network device forwards the target data flow through the idle egress port.

The target data flow is a data flow corresponding to a target address range. The target address range is an address range corresponding to the host corresponding to the target port, and the target address range is determined based on the information of the network device to which the target port belongs and the information of the target port. When the first network device determines only the target port that is in the pre-congestion state or the congestion state, the target data flow includes a data flow sent to the host corresponding to the target port. When the first network device further determines the egress port queue that is in the pre-congestion state or the congestion state, the target data flow includes a data flow that is sent to the host corresponding to the target port and whose priority corresponds to the identifier of the egress port queue that is in the congestion state or the pre-congestion state. Optionally, the target data flow may alternatively be an elephant flow in the data flow sent to the host corresponding to the target port, or an elephant flow in the data flow that is sent to the host corresponding to the target port and whose priority corresponds to the identifier of the egress port queue that is in the congestion state or the pre-congestion state. The elephant flow is a data flow whose traffic (in total bytes) in a unit time exceeds a specified threshold.

A packet in a data flow carries a priority. When forwarding the data flow, a network device schedules data flows with a same priority to a same egress port queue. In this way, packets with different priorities enter different egress port queues on an egress port. Therefore, there is a correspondence between a packet priority and an identifier of an egress port queue. When all network devices in the network system forward data flows by using a same scheduling rule, one network device may learn, based on a priority of a data flow received by the network device, of an identifier of an egress port queue that corresponds to the data flow and that is on another network device.

When the target port is a downlink port in the Clos architecture shown in FIG. 1, that the target data flow corresponds to the target address range means that an address of the target data flow belongs to the target address range. When the target port is an uplink port in the Clos architecture shown in FIG. 1, that the target data flow corresponds to the target address range means that an address of the target data flow does not belong to the target address range. When the target port is an intra-group port or an inter-group port in the architecture shown in FIG. 2, that the target data flow corresponds to the target address range means that an address of the target data flow belongs to the target address range.

In step 303, the second network device receives the notification B.

The second network device is any one of the at least one second network device. Optionally, after receiving the notification B, the second network device stores the information of the network device to which the target port belongs and the information of the target port that are carried in the notification B. The second network device may further store the state of the target port. For example, the second network device sets a first table to store information of a port that is in the pre-congestion state or the congestion state, and each entry of the first table includes information about one target port and information of a network device to which the target port belongs. For another example, the second network device sets a second table, and each entry of the second table includes information about one target port, information of a network device to which the target port belongs, and a state of the target port. Further, the second network device may set an aging time for information about each target port, and delete the information of the target port after the aging time expires.

In step 304, the second network device determines the target data flow.

Because the second network device receives the notification B, the second network device is not the network device to which the target port belongs.

In an implementation, the second network device determines the target address range based on the information of the network device to which the target port belongs and the information of the target port that are in the notification B, stores the target address range, and determines a subsequently received data flow whose destination address belongs to the target address range as the target data flow. For example, the second network device obtains a destination address of a received data flow. If the destination address belongs to the target address range, or the destination address belongs to the target address range and the priority of the data flow corresponds to the identifier of the target egress port queue, the second network device determines the data flow as the target data flow. The target address range is an address range corresponding to the host corresponding to the target port, and a first forwarding path (that is, an initial forwarding path before the notification B is received) of the target data flow includes the target port.

In step 305, the second network device determines whether an idle egress port capable of forwarding the target data flow exists on the second network device, obtains a result of the determination, and processes the target data flow based on the result of the determination.

The idle egress port is another egress port that is on the second network device, is not in the congestion state or the pre-congestion state, and is different from a current egress port of the target data flow. A buffer usage of the idle egress port does not exceed the foregoing first threshold, or the length of no egress port queue in the idle egress port exceeds the foregoing second threshold.

Figure 4:
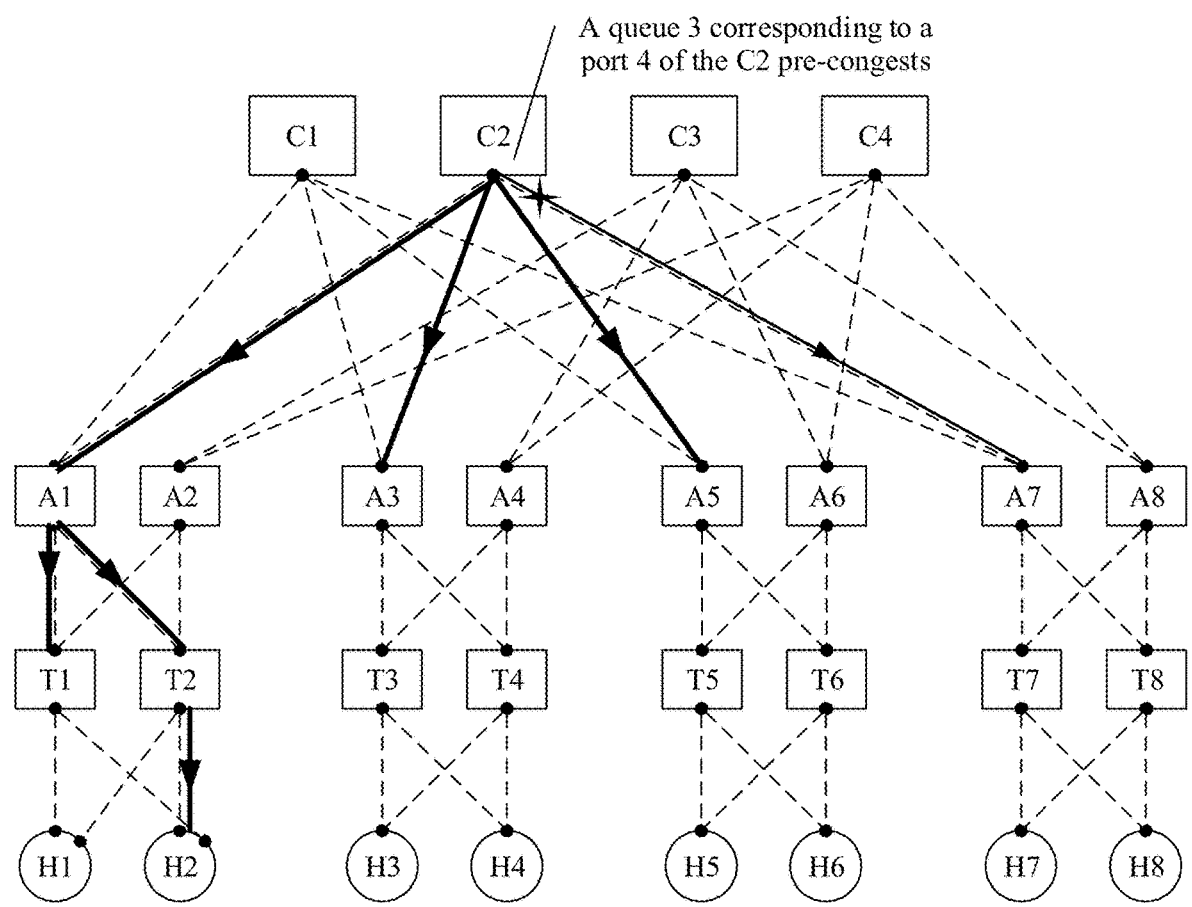
FIG. 4 is a schematic diagram of a processing procedure performed when a target port is a downlink port of a core device in a multi-plane Clos architecture.

For example, in the Clos architecture shown in FIG. 4, when the first network device is the core device C2, the target port is a downlink port 4; and when the second network device is an aggregation device A1, a target address range determined by the aggregation device A1 is an address range corresponding to the hosts connected to the access devices T7 and T8. When the aggregation device A1 receives a data flow whose destination address belongs to the target address range, the aggregation device A1 determines whether an idle egress port exists in an uplink port of the aggregation device A1, and a forwarding path on which the idle egress port is located does not include the downlink port 4 of the core device C2.

That the second network device processes the target data flow based on the result of the determining includes step 306 and step 307.

In step 306, an idle egress port exists on the second network device, and the second network device sends the target data flow through the idle egress port.

In this application, a forwarding path on which the idle egress port is located and that is determined by the second network device for the target data flow is referred to as a second forwarding path of the target data flow, and the second forwarding path does not include the target port.

In step 307, no idle egress port exists on the second network device, and the second network device forwards the target data flow through the initial forwarding path (namely, the first forwarding path) of the target data flow, that is, an egress port that is of the target data flow and that is on the second network device is not changed.

Further, because no idle egress port exists on the second network device, the second network device notifies the pre-congestion state or the congestion state of the target port to at least one third network device capable of sending a data flow to the host corresponding to the target port through the at least two forwarding paths. Optionally, the second network device generates a notification C based on the information of the network device to which the target port belongs and the information of the target port, and sends the notification C to the third network device. The at least one third network device may be preconfigured on the second network device, or may be determined by the second network device based on the information of the network device to which the target port belongs and the information of the target port.

According to the method shown in FIG. 3, when an egress port or an egress port queue of any network device in the network system shown in FIG. 1 or FIG. 2 is in the pre-congestion state or the congestion state, the network device may send a notification, so that a network device that receives the notification handles network congestion. The network congestion handling includes reselecting a forwarding path for a target data flow to avoid sending the target data flow to the egress port. The network congestion handling may further include sending the notification to another network device to propagate the target port. Network congestion can be avoided by using the method shown in FIG. 3. In addition, the method may further implement load balancing in a network, either part of a network or an entire network, to improve network resource utilization.

With reference to FIG. 4 to FIG. 12, the following describes different implementations of the steps in the method shown in FIG. 3.

FIG. 4 is a schematic diagram of a processing procedure performed when a target port is a downlink port of a core device in the multi-plane Clos architecture shown in FIG. 1. As shown in FIG. 4, a thin solid line represents a link on which the target port is located, and a thick solid line represents a forwarding path of a notification. A data flow (denoted as a data flow 1) sent from a host H2 to a host H7 arrives at a core device C2 through an access device T2 and an aggregation device A1. The core device C2 forwards the data flow 1 to an aggregation device A7 through an egress port queue 3 (Q3) of a port 4 (P4). In the process of forwarding the data flow 1, the core device C2 detects that the length of the egress port queue 3 exceeds a second threshold, determines that the egress port queue 3 is in a pre-congestion state, and further determines that the port 4 is the target port (step 301).

The core device C2 first determines whether another idle egress port capable of arriving at the host H7 exists on the core device C2. When no idle egress port capable of arriving at the host H7 exists on the core device C2, the core device C2 sends a multicast notification to a plurality of aggregation devices other than the aggregation device A7 that is connected to the port 4 (step 302). In a multi-plane scenario, the plurality of aggregation devices and the core device C2 belong to a same forwarding plane. In FIG. 4, if the core device C2 sends a notification in a multicast mode, the core device 2 determines a target multicast group corresponding to the port 4. A multicast source of the target multicast group is the core device C2, and multicast egress ports are ports connected to aggregation devices A1, A3, and A5, and are assumed to be a port 1, a port 2, and a port 3. Then, the core device C2 sends the multicast notification through the port 1, the port 2, and the port 3. The multicast notification includes an identifier (C2) of the core device C2 and an identifier (P4) of the port 4. Optionally, the multicast notification may further include one or more of: a role of the core device C2, a port attribute (a downlink port) of the port 4, and an identifier (Q3) of the egress port queue 3. In addition, the core device C2 may further store congestion information of the port 4. The multicast notification arrives at the aggregation devices A1, A3, and A5. The following uses the aggregation device A1 as an example to describe a processing procedure of the aggregation device.

The aggregation device A1 receives the multicast notification sent by the core device C2 (step 303). Optionally, the aggregation device A1 obtains congestion information ("C2P4", "C2P4Q3", or "C2P4Q3 downlink") in the multicast notification, stores the congestion information, and sets an aging time. The aggregation device A1 determines a target data flow (step 304). When determining the target data flow, the aggregation device A1 first determines an address range (a target address range) of a host corresponding to the port P4 of the core device C2, and determines a data flow whose destination address belongs to the target address range as the target data flow, or determines, as the target data flow, a data flow whose destination address belongs to the target address range and whose priority corresponds to the Q3.

When the address range of the host corresponding to the port P4 of the core device C2 is determined, in an optional manner, because the target port P4 is the downlink port, the core device C2 determines address ranges of all hosts connected to the aggregation device A7 connected to the P4.

Figure 5:
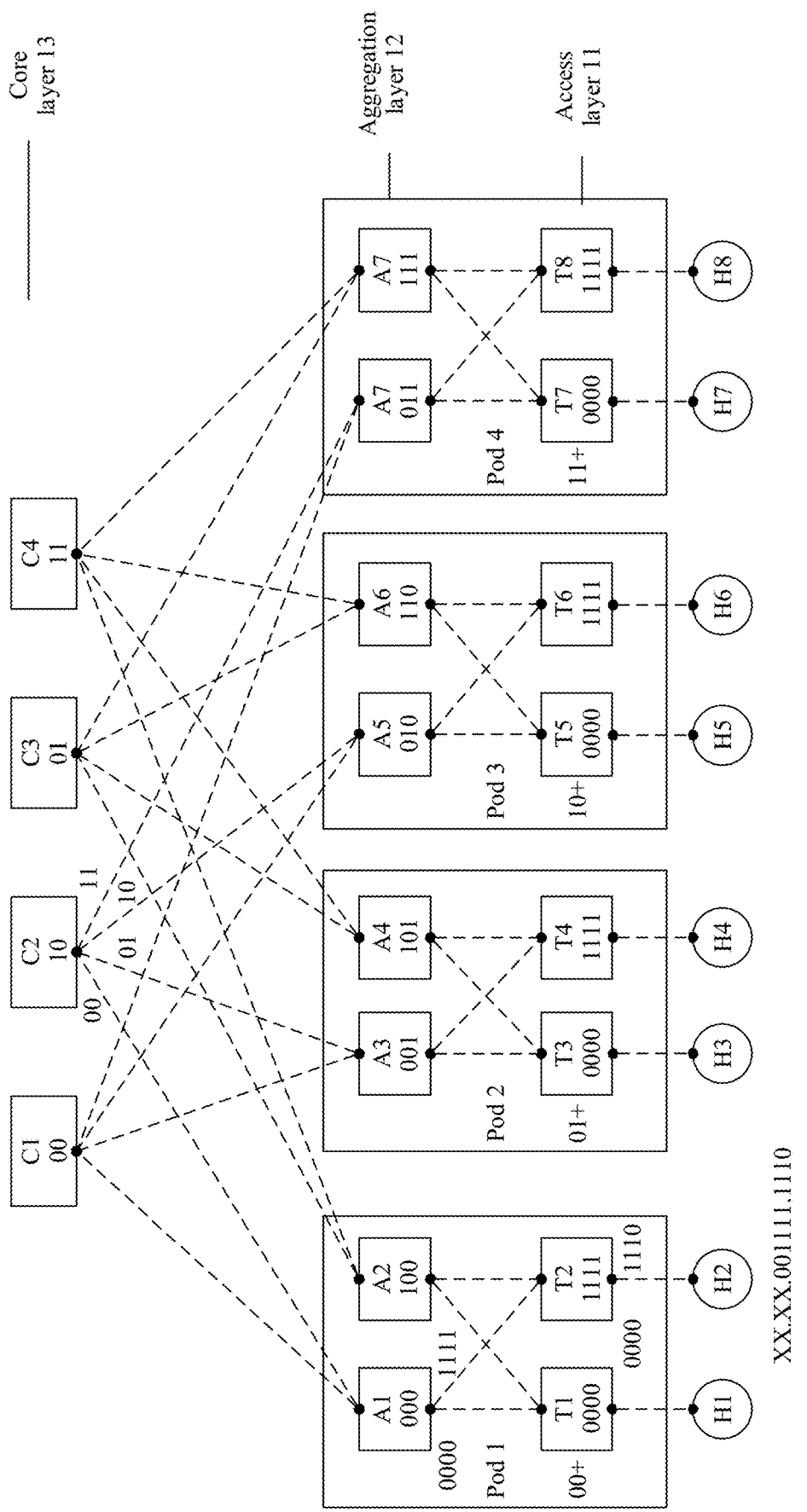
FIG. 5 is a schematic diagram of a mechanism for numbering a switch and a port of the switch according to an embodiment of this application.

In an implementation, addresses may be allocated to a network device and a host based on the network architecture. For example, a number is allocated to each network device in FIG. 1, and the number is an identifier of the network device. As shown in FIG. 5, a number in each block representing a network device is a specific implementation of an identifier of a switch. For example, 10 may be a value of the C2. Each combination of an identifier of a network device and a downlink port identifier may uniquely identify a lower-layer device. For example, a combination of a core device 10 and a port 00 may identify an aggregation device 000, and a combination of an identifier (00) of a pod in which the aggregation device 000 is located and a port 1111 may identify an access device 1111. An address of a host includes a port of an access device connected to the host and an identifier of the access device on the aggregation device. According to the foregoing addressing rule, an address of the host H2 may be XX.XX.001111.1110.

According to the addressing rule shown in FIG. 5, an identifier of a network device included in the multicast notification received by the aggregation device A1 is 10, and a port identifier is 11, so that the aggregation device A1 determines, based on the multicast notification, that a host address range determined by the multicast notification is least significant five bits to least significant 10 bits, that is, 110000 or 111111, and that a determined priority is a priority corresponding to the Q3, for example, 3. The aggregation device A1 determines, as the target data stream, a received data flow whose destination address falls within the host address range and whose priority is 3.

When address ranges of all hosts connected to the port P4 of the core device C2 are determined, in another optional manner, the aggregation device A1 determines, through table lookup, the address ranges of the hosts connected to the port P4 of the core device C2. For example, each network device stores three tables. A first table stores a correspondence between a core device, a port of the core device, and an aggregation device. A second table stores a connection relationship between an aggregation device, a port of the aggregation device, and an access device. A third table stores a connection relationship between an access device and a host address. After receiving the multicast notification, the aggregation device A1 determines, based on the identifier (C2) of the network device in the multicast notification, that a role of the network device is a core device, searches the first table for the aggregation device A7 based on the C2 and the P4, then searches the second table based on the aggregation device A7 to find access devices T7 and T8, and finally searches the third table for addresses of hosts connected to the access devices T7 and T8, to generate a host address list corresponding to the congestion information. Optionally, the three tables may also be integrated into one table, and correspondence between a core device, an aggregation device, an access device, and a host address needs to be stored in the table.

After determining the target data flow (assuming that the target data flow is the data flow 1), the aggregation device A1 determines whether an idle uplink egress port exists on the aggregation device A1 (because the target port P4 is the downlink port of the core device, and the downlink port of the core device corresponds to an uplink port of an aggregation device, the aggregation device A1 needs to determine whether an idle uplink port exists) (step 305). When an idle uplink egress port exists or is available, the aggregation device A1 uses the idle uplink egress port as an egress port of the target data flow, and forwards the target data flow through the idle uplink egress port (step 306). When no idle uplink egress port exists, the aggregation device A1 continues to forward the target data flow through an initial forwarding path corresponding to the target data flow (step 307).

Before the congestion information is aged, the aggregation device A1 may process a data flow according to the foregoing method when receiving any data flow.

In addition, after performing step 307, the aggregation device A1 further propagates the congestion information to the access device. To be specific, the aggregation device A1 further generates another notification, and sends the other notification to the access devices T1 and T2 (step 302). The other notification includes the congestion information. After receiving the other notification, the access devices T1 and T2 perform corresponding processing. The following uses the access device T2 as an example to describe a processing procedure of the access device.

After the access device T2 receives the other notification (step 303), similar to the aggregation device A1, the access device T2 obtains the congestion information in the other notification, stores the congestion information, and sets an aging time. The access device T2 determines the target address range based on the congestion information, determines the target data flow based on the target address range (step 304), and determines whether an idle egress port capable of forwarding the target data flow exists on the access device T2 (step 305). If an idle egress port exists, the access device T2 forwards the target data flow through the idle egress port (step 306). If no idle egress port exists, the access device T2 forwards the target data flow through the initial forwarding path of the target data flow (step 307). In addition, the access device T2 determines a source host of the target data flow, and sends a backpressure message to the source host. The backpressure message is used to notify the source host to perform an operation of avoiding network congestion. The operation of avoiding network congestion may be reducing a rate of sending data to the access device T2 or reducing a rate of sending the target data flow to the access device T2. A manner for the access device T2 to determine the target data flow and process the target data flow is similar to that for the aggregation device A1, and is not described here in detail again. For details, refer to the description of the processing procedure of the aggregation device A1.

Through the foregoing process, after an egress port of a core device in the Clos system goes into a pre-congestion state or a congestion state, the core device may send the congestion information to the aggregation device, and the aggregation device may send the congestion information to the access device. Each network device that receives the congestion information performs an operation of handling network congestion, so that network congestion can be avoided, and bandwidth utilization of the entire Clos system can be improved.

FIG. 6 is a schematic diagram of a processing procedure performed when a target port is a downlink port of an aggregation device in a multi-plane Clos architecture shown in FIG. 1. A thin solid line represents a link on which the target port is located, and a thick solid line represents a forwarding path of a notification. As shown in FIG. 6, it is assumed that a host H2 sends a data flow 1 to a host H7; and when the data flow 1 enters a queue 3 of an egress port 3 on an aggregation device A7, the aggregation device A7 detects that a length of the queue 3 of the egress port 3 exceeds a second threshold and determines that the queue 3 is in a pre-congestion state. In this case, the egress port 3 is the target port. No idle downlink port exists on the aggregation device A7. The aggregation device A7 sends the notification to a plurality of second network devices (step 302). The plurality of second network devices are determined based on a port attribute (a downlink port) of the egress port 3 and an attribute (an aggregation device) of the aggregation device A7, and include all access devices except an access device T7 connected to the egress port 3. The notification includes an identifier (A7) of the aggregation device A7 and an identifier (P3) of the egress port 3. Optionally, the notification may further include one or more of: a role (an aggregation device) of the aggregation device A7, the attribute (a downlink port) of the egress port 3, and an identifier (Q3) of the queue 3. The notification may be sent in a unicast or multicast mode.

A notification sent by the aggregation device A7 to an access device T8 may directly arrive at the access device T8, and a notification sent to access devices T1 to T6 first arrives at the core devices C1 and C2 that belong to a same forwarding plane as the aggregation device A7.

Because the core devices C1 and C2 cannot send a data flow to a host corresponding to the egress port 3 of the aggregation device A7 through at least two forwarding paths, the core devices C1 and C2 are not destinations of the notification. After receiving the notification, the core devices C1 and C2 forward the notification to ports other than the port that received the notification (FIG. 6 shows only a forwarding path of the core device C2).

After being forwarded by the core device C1 or C2, the notification arrives at aggregation devices A1, A3, and A5 that belong to a same forwarding plane as the aggregation device A7. Because the aggregation devices A1, A3, and A5 cannot send a data flow to the host corresponding to the egress port 3 of the aggregation device A7 through at least two forwarding paths, the aggregation devices A1, A3, and A5 are not destinations of the notification, and the aggregation devices A1, A3, and A5 still need to forward the received notification. The aggregation device A1 is used as an example. After receiving the notification, the aggregation device A1 replicates and forwards the notification to downlink ports, that is, sends the notification to connected access devices T1 and T2.

In the scenario shown in FIG. 6, a destination of the notification sent by the aggregation device A7 is an access device other than the access device T7. Therefore, after receiving the notification, both the core device and the aggregation device only forward the notification. After receiving the notification, any one of the access devices T1 to T6 and T8 performs step 304 to step 307 with reference to the manners described in the foregoing embodiments.

Through the foregoing process, after the egress port is in the pre-congestion state or the congestion state, the aggregation device in the Clos system may send congestion information to all other access devices except an access device connected to the egress port. Each access device that receives the congestion information performs an operation of handling network congestion. Therefore, the foregoing process can alleviate network congestion and improve bandwidth utilization of the entire Clos system.

FIG. 7 is a schematic diagram of a processing procedure performed when a target port is a downlink port of an access device in a multi-plane Clos architecture. As shown in FIG. 7, a thin solid line represents a link on which the target port is located, and a thick solid line represents a forwarding path of a notification. As shown in FIG. 7, it is assumed that a host H2 sends a data flow 1 to a host H7; and when the data flow 1 enters a queue 3 of an egress port 3 on an access device T7, the access device T7 detects that a length of the queue 3 of the egress port 3 exceeds a second threshold and determines that the queue 3 is in a pre-congestion state. In this case, the egress port 3 is determined as the target port. In addition, no other downlink port that can send a data flow to arrive at the host H7 exists on the access device T7. The access device T7 generates a notification, where the notification includes an identifier (T7) of the access device T7 and an identifier (P3) of the egress port 3. Further, the notification may include one or more of a role (an access device) of the access device T7, an attribute (a downlink port) of the egress port 3, and an identifier (Q3) of the queue 3. The access device T7 sends the notification to a plurality of second network devices. The plurality of second network devices include several or all other access devices except the access device T7. In addition, the access device T7 is directly connected to the host H7, and the access device T7 learns of an address of the host H7. Therefore, the notification may further include the address of the host H7. In this way, another access device that receives the notification may directly determine the target data flow based on the address of the host H7. The notification may be sent in a unicast or multicast mode.

Similar to the process described in FIG. 6, after receiving the notification, an aggregation device or a core device forwards the notification based on a destination address of the notification. After receiving the notification, each access device performs an operation similar to that performed by the access device T2 in FIG. 4.

In scenarios shown in FIG. 4, FIG. 6, and FIG. 7, all target ports are downlink ports. In another embodiment, the target port may alternatively be an uplink port.

FIG. 8 is a schematic diagram of a processing procedure performed when a target port is an uplink port of an aggregation device in a multi-plane Clos architecture. A thin solid line represents a link on which the target port is located, and a thick solid line represents a forwarding path of a notification. A data flow 1 sent from a host H2 to a host H7 is still used as an example. In a process of forwarding the data flow 1, an aggregation device A1 detects that a length of an egress port queue 3 (Q3) of a port 1 (P1) on which the data flow 1 is located exceeds a second threshold, and determines that the egress port queue 3 is in a pre-congestion state. Therefore, the egress port 1 is the target port. The aggregation device A1 determines whether another idle egress port (an uplink port) capable of arriving at the host H7 exists on the aggregation device A1. If another idle egress port capable of arriving at the host H7 exists, the aggregation device A1 switches the data flow 1 to the idle egress port, and sends the data flow 1 through the idle egress port. When no other idle egress port capable of arriving at the host H7 exists, the aggregation device A1 sends, in a multicast or unicast mode, a notification to a plurality of access devices connected to the aggregation device A1 (step 302). The notification includes an identifier (A1) of the aggregation device A1 and an identifier (P1) of the port 1. Optionally, the notification may further include a role (an aggregation device) of the aggregation device A1, an attribute (an uplink port) of the port 1, and an identifier (Q3) of the egress port queue 3. In FIG. 8, aggregation devices A3, A5, and A7 can send, through at least two forwarding paths, a data flow to a host corresponding to the target port. However, because the aggregation devices A3, A5, and A7 are not devices with the least hops from the aggregation device A1, the aggregation device A1 sends the notification only to access devices T1 and T2, but does not send the notification to the aggregation devices A3, A5, A7, or another access device. The notification arrives at the access devices T1 and T2. The following description uses the access device T2 as an example to describe a processing procedure of the access device.

After receiving the notification (step 303), the access device T2 obtains congestion information in the notification, stores the congestion information, and sets an aging time. The access device T2 determines a target address range corresponding to the aggregation device A1, for example, addresses of hosts corresponding to all access devices connected to the aggregation device A1, and determines, as a target data flow, a data flow whose destination address does not belong to the target address range or whose destination address does not belong to the target address range and whose priority corresponds to the Q3 (step 304). In this implementation, an uplink port of the aggregation device A1 is faulty, and data flows sent between the hosts of the aggregation device A1 do not pass through the uplink port of the aggregation device A1. Therefore, the access device T2 selects a data flow sent to a host beyond a management range of the aggregation device A1 as the target data flow. After determining the target data flow, the access device T2 determines whether an idle egress port (an uplink port) corresponding to the congestion information exists on the access device T2 (step 305). If an idle egress port exists, the access device T2 forwards the target data flow through the idle egress port (step 306). If no idle egress port exists, the access device T2 sends the target data flow through an initial forwarding path of the target data flow (step 307). Further, the access device T2 determines a source host of the target data flow, and sends a backpressure message to the source host. The backpressure message is used to notify the source host to perform an operation of handling network congestion. The operation of handling network congestion may be reducing the rate of sending data to the access device T2 or reducing the rate of sending the target data flow to the access device T2.

In another scenario, when the target port is an uplink port of the access device, the access device determines a data flow sent to the uplink port as the target data flow, and determines whether an idle egress port (an uplink port) capable of forwarding the target data flow exists on the access device. If an idle egress port exists, the target data flow is sent through the idle egress port. If no idle egress port exists, a source host of the target data flow is determined, and the back pressure message is sent to the source host. The backpressure message is used to indicate the source host to perform the operation of handling network congestion. It can be learned that when the target port is the uplink port of the access device, the access device does not need to send a notification.

The method shown in FIG. 3 of this application may be further applied to a single-plane Clos architecture. In the single-plane Clos architecture, each core device is connected to all aggregation devices.

FIG. 9 is a schematic diagram of a processing procedure performed when a target port is a downlink port of a core device in a single-plane Clos architecture. As shown in FIG. 9, a thin solid line represents a link on which the target port is located, and a thick solid line represents a forwarding path of a notification. A data flow (denoted as a data flow 1) sent from a host H2 to a host H7 arrives at a core device C1 through an access device T2 and an aggregation device A1. The core device C1 forwards the data flow 1 to an aggregation device A7 through an egress port queue 3 (Q3) of a port 7 (P7). In the process of forwarding the data flow 1, a core device C2 detects that a length of the egress port queue 3 exceeds a second threshold and determines that the egress port queue 3 is in a pre-congestion state. In this case, the port 7 is determined as the target port (step 301). Because no idle egress port (that is, an idle downlink egress port) having a same attribute as the port 7 exists on the core device C1, the core device C1 sends the notification to other aggregation devices except the aggregation device A7. For congestion information included in the notification, refer to the description related to FIG. 4. After receiving the notification, the aggregation device or devices (for example, A1) determine a target address range (that is, the addresses of the hosts connected to the access devices T7 and T8) based on the notification, determines a target data flow based on the target address range after receiving the data flow, and then determines whether an idle egress port (an uplink port) capable of forwarding the target data flow exists. When an idle egress port exists, the target data flow is switched to the idle egress port; and when no idle port exists, the data flow is forwarded through a current egress port of the target data flow, a notification is regenerated based on the congestion information, and the notification is sent to all access devices connected to the aggregation device.

After receiving the notification, the access device (for example, T2) determines a target data flow based on the congestion information. In addition, when an idle egress port capable of forwarding the target data flow exists, the access device switches the target data flow to the idle egress port (the uplink port); and when no idle egress port exists, the access device sends the backpressure message to a source host of the target data flow. The backpressure message is used to indicate to the source host to perform an operation of handling network congestion.

FIG. 10 is a schematic diagram of a processing procedure performed when a target port is a downlink port of an aggregation device in a single-plane Clos architecture. As shown in FIG. 10, a thin solid line represents a link on which the target port is located, and a thick solid line represents a forwarding path of a notification. A data flow (denoted as a data flow 1) sent from a host H2 to a host H7 arrives at an aggregation device A7 through an access device T2, an aggregation device A1, and a core device C1. The aggregation device A7 forwards the data flow 1 to an access device T7 through an egress port queue 3 (Q3) of a port 1 (P7). In the process of forwarding the data flow 1, the aggregation device A7 detects that a length of the egress port queue 3 exceeds a second threshold and determines that the egress port queue 3 is in a pre-congestion state. In this case, the port 1 is determined as the target port (step 301). Because no idle egress port (that is, an idle downlink egress port) having a same attribute as the port 1 exists on the aggregation device A7, the aggregation device A7 sends the notification to all core devices and another access device (for example, the access device T8) connected to the aggregation device. The notification includes congestion information (for the congestion information, refer to the foregoing embodiments). In this case, the core devices C1 and C2 can also send, through at least two forwarding paths, a data flow to a host corresponding to the port 1 of the aggregation device A7, and the core devices C1 and C2 have only one hop to the aggregation device A7. The aggregation device sends the notification to the core devices C1 and C2 and the access device T8.

After receiving the notification, the core device (for example, C1) determines a target data flow based on the congestion information. If an idle downlink egress port capable of forwarding the target data flow exists on the core device, the core device sends the target data flow through the idle downlink egress port. If no idle downlink egress port capable of forwarding the target data flow exists on the core device, the notification is sent to an aggregation device other than the aggregation device A7, and the notification includes the congestion information.

After receiving the notification sent by the core device, any aggregation device performs an operation that is the same as that performed by the aggregation device A1 in FIG. 9.

After receiving the notification, any access device in FIG. 10 performs an operation that is the same as that performed by the access device T2 in FIG. 9.

A processing procedure performed when the target port is a downlink port of an access device in the single-plane Clos architecture is similar to a processing procedure performed when the target port is a downlink port of an access device in a multi-plane architecture. A processing method used when the target port is an uplink port in the single-plane Clos architecture is similar to a processing method used when the target port is an uplink port in the multi-plane Clos architecture.

The method shown in FIG. 3 of this application may also be applied to the network architecture shown in FIG. 2. In the network architecture shown in FIG. 2, an identifier of each switch may be a number of the switch. For example, the number of the switch may be xy, where x represents the number of the pod in which the switch is located, and y represents the number of the switch in the pod in which the switch is located. For example, a switch 11 represents a switch whose number is 1 in the pod 1. In this way, a first switch may learn of the role of a second switch based on the number of the second switch, and may also learn of an attribute of a port of the second switch.

Figure 11:
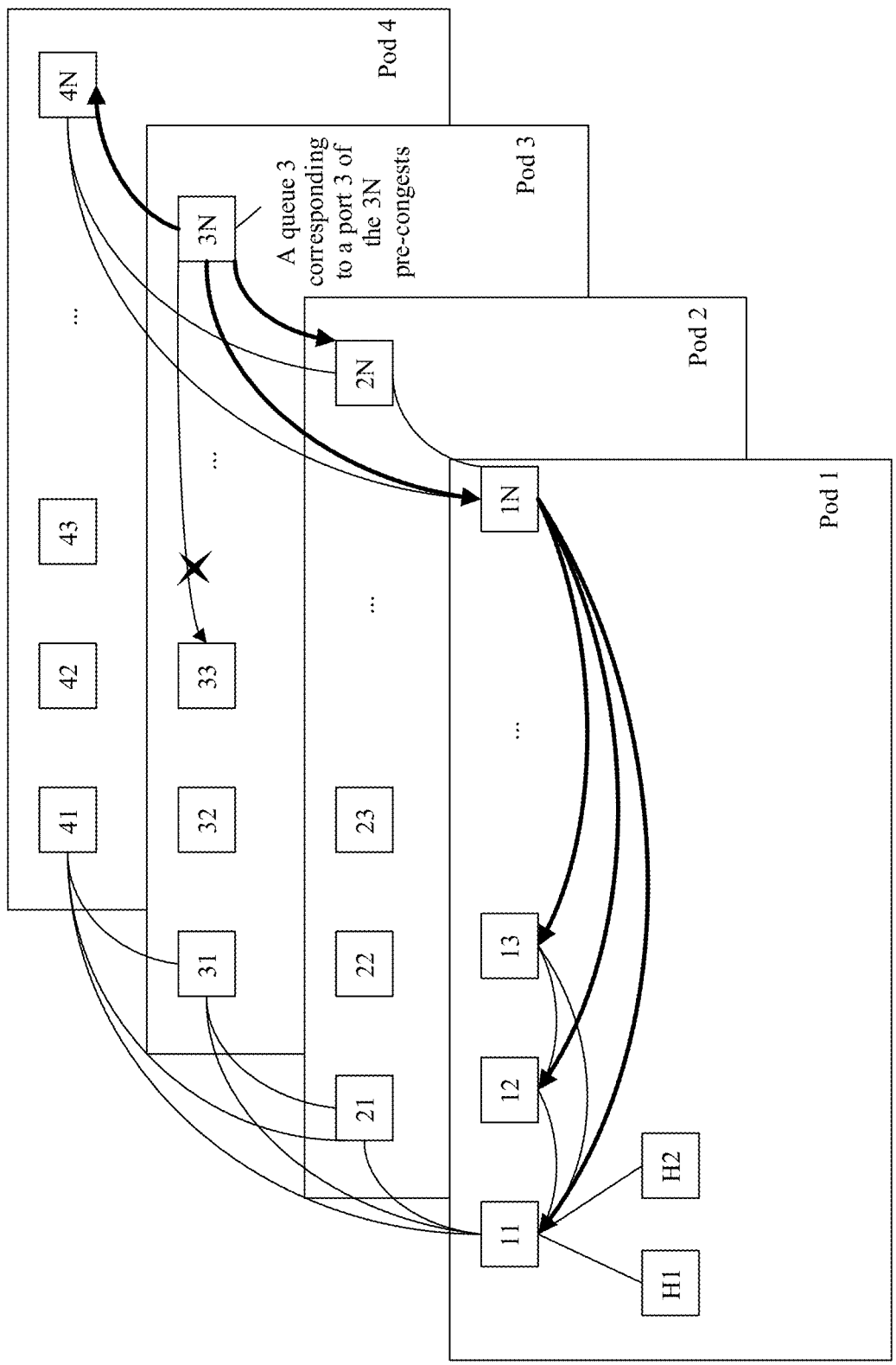
FIG. 11 is a schematic diagram of a processing procedure performed when a target port is an intra-group port in an architecture shown in FIG. 2.
Figure 12:
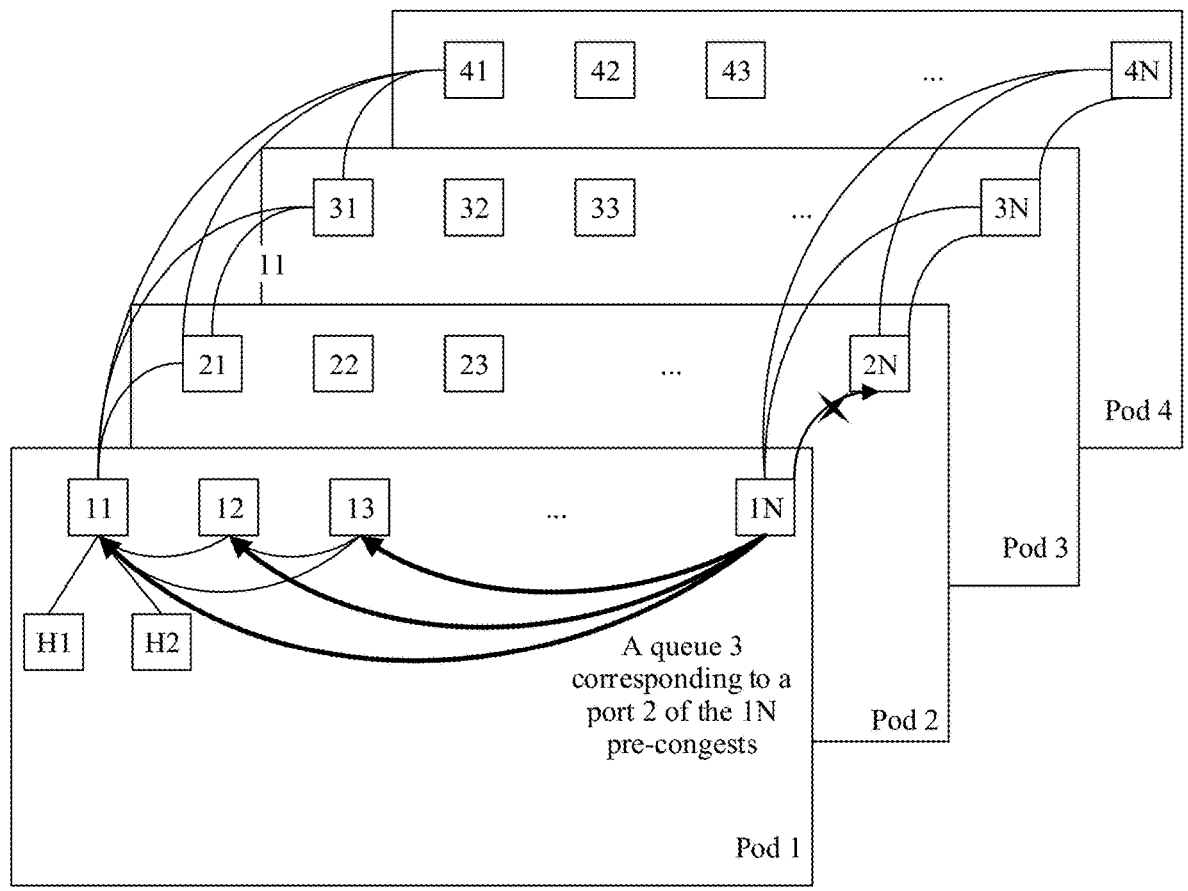
FIG. 12 is a schematic diagram of a processing procedure performed when a target port is an inter-group port in an architecture shown in FIG. 2.

FIG. 11 is a schematic diagram of a processing procedure performed when a target port is an intra-group port in an architecture shown in FIG. 2. It is assumed that in a process of sending a data flow 1 to a switch 33, a switch 3N detects that a length of an egress port queue 3 of a port 3 exceeds a second threshold and determines that the egress port queue 3 is in a pre-congestion state. In this case, the port 3 is determined as the target port (step 301). The switch 3N sends a notification to a plurality of second network devices, and the notification includes an identifier of the switch 3N and an identifier of the port 3 (step 302). Optionally, the identifier of the switch 3N may be obtained by parsing the identifier of the port 3. Correspondingly, the identifier of the switch 3N and the identifier of the port 3N may use only one field. The notification may further include an identifier of the egress port queue 3. When an identifier of a switch in the network architecture shown in FIG. 2 is in another form, the notification may further include an attribute of the port 3 and a role (an inter-group switch) of the switch 3N. The plurality of second network devices include inter-group switches connected to the switch 3N, that is, switches 1N, 2N, and 4N. There is only one hop between the switch 3N and each of the inter-group switches. The switch 3N sends the notification to the switches 1N, 2N, and 4N in a multicast or unicast mode. The following uses the switch 1N as an example to describe a process in which the switches 1N, 2N, and 4N process the notification.

After receiving the notification (step 303), the switch 1N obtains congestion information in the notification, stores the congestion information, and sets an aging time. The switch 1N determines a target data flow based on the congestion information (step 304). The target data flow is a data flow sent to a host connected to the switch 3N, or the target data flow is a data flow that is sent to a host connected to the switch 3N and whose priority corresponds to the egress port queue 3. The switch 1N determines whether an idle egress port capable of sending the target data flow exists on the switch 1N, that is, an idle inter-group port (step 305). If an idle egress port exists, the switch 1N forwards the target data flow through the idle egress port (step 306). If no idle egress port exists, the switch 1N sends the target data flow through an initial forwarding path of the target data flow (step 307). In addition, the switch 1N sends the notification to another switch in a same switch group based on the congestion information. Switches 11, 12, and 13 receive the notification, and perform processing similar to that of an access device in a Clos architecture.

In the architecture shown in FIG. 2, an address may be allocated to a host based on a network architecture. To be specific, an address of each host may be determined based on the number of a switch connected to the host. For example, an address of a host connected to the switch 1N is 1N.XXX.XXX. According to the foregoing addressing rule, when an intra-group port between the switch 3N and the switch 33 is the target port, the target data flow is a data flow whose destination address is 33.XXX.XXX and whose priority corresponds to the Q3.

In the network architecture shown in FIG. 2, when the target port is a port of a switch connected to a host, a processing procedure of the switch is similar to a processing procedure performed when the target port is the intra-group port.

FIG. 12 is a schematic diagram of a processing procedure performed when a target port is an inter-group port in an architecture shown in FIG. 2. It is assumed that in a process of sending a data flow 1 to a switch 2N, a switch 1N detects that a length of an egress port queue 3 of a port 2 of the switch 1N exceeds a second threshold, that is, the egress port queue 3 is in a pre-congestion state. The switch 1N determines the port 2 as the target port (step 301). A host corresponding to the target port is a host connected to the switch 2N. The switch 1N sends a notification to a plurality of second network devices (step 302). The plurality of second network devices include intra-group switches connected to the switch 1N, that is, switches 11, 12, 13, and the like. The notification includes an identifier (1N) of the switch 1N, and an identifier (P2) of the port 2. The notification may further include an identifier (Q3) of the egress port queue 3. When an identifier of a switch in the system shown in FIG. 2 is in another form, the notification may further include an attribute of the port 2 and a role (an intra-group switch) of the switch 1N. The switch 1N sends the notification to the switches 11, 12, 13, and the like in a multicast or unicast mode. Switches 11, 12, 13, and the like receive the notification, and perform processing similar to that of an access device in a Clos architecture.

It can be learned from the description of the foregoing embodiments that, according to the method provided in FIG. 3 in this application, after it is detected that an egress port or an egress port queue is in a congestion state or a pre-congestion state, a notification can be published to another network device in a network, and a network device that receives the notification selects an idle egress port for a target data flow or continues to propagate the congested state of the egress port or the egress port queue in the network, so that all network devices in the entire network can perform a network congestion handling operation, to alleviate network congestion in a plurality of network architectures. In addition, after receiving the notification, the network device in this application may forward the target data flow through the idle egress port, to implement end-to-end load balancing in the entire network, and improve network resource utilization. In addition, when the target data flow in this application is based on the egress port queue, only the forwarding path of a data flow causing congestion is adjusted and the normal data flow is not affected, to further improve data flow forwarding efficiency.

Figure 13:
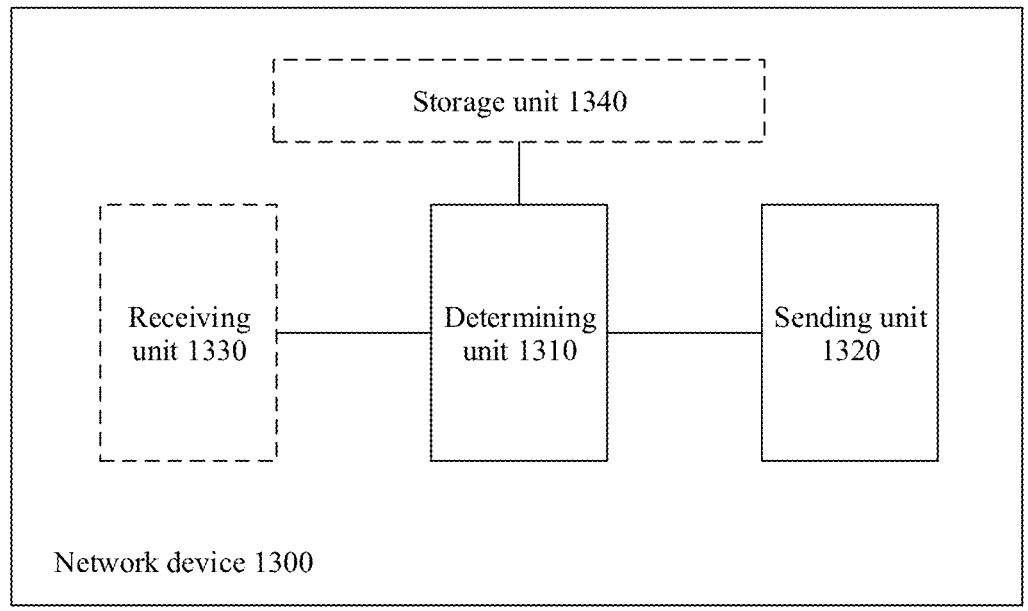
FIG. 13 is a schematic structural diagram of a network device according to an embodiment of this application.

Further, an embodiment of this application provides a network device 1300. The network device 1300 may be any network device in FIG. 1 or FIG. 2. As shown in FIG. 13, the network device 1300 includes a determining unit 1310 and a sending unit 1320. Optionally, the network device 1300 further includes a receiving unit 1330 and a storage unit 1340. The network device 1300 is configured to implement a function of the first network device in FIG. 3.

The determining unit 1310 is configured to determine a target port, where the target port is an egress port that is in a pre-congestion state or a congestion state. The sending unit 1320 is configured to send a first notification to at least one second network device. The at least one second network device includes one or more network devices capable of sending, through at least two forwarding paths, a data flow to a host corresponding to the target port, and the first notification includes information of a network device to which the target port belongs and information of the target port.

Optionally, the network device to which the target port belongs is the first network. The determining unit is configured to: monitor egress ports of the first network device; and when a buffer usage of one of the egress ports of the first network device exceeds a port buffer threshold, determine that the egress port is the target port.

Optionally, the network device to which the target port belongs is the first network. The determining unit is configured to: monitor egress port queues of the first network device; and when a length of one of the egress ports exceeds a queue buffer threshold, determine that an egress port corresponding to the egress port queue is the target port.

Optionally, the network device to which the target port belongs is a third network device. The receiving unit 1330 is configured to receive a second notification sent by the third network device, and the second notification includes information of the third network device and the information of the target port. The determining unit determines the target port based on the second notification.

Optionally, the information of the network device to which the target port belongs includes an identifier of the network device to which the target port belongs, and the information of the target port includes an identifier of the target port or an identifier of a forwarding path on which the target port is located.

Optionally, the information of the network device to which the target port belongs further includes a role of the network device to which the target port belongs, and the role indicates the location of the network device to which the target port belongs. The information of the target port further includes an attribute of the target port, and the attribute indicates the direction in which the target port sends a data flow.

Optionally, the determining unit is further configured to determine whether no idle egress port capable of forwarding a target data flow corresponding to the target port exists on the network device. The target data flow is a data flow corresponding to a target address range. The target address range is an address range corresponding to the host corresponding to the target port, and the target address range is determined based on the information of the network device to which the target port belongs and the information of the target port.

Optionally, the information of the target port may further include an identifier of a target egress port queue. The target egress port queue is an egress port queue that is in the congestion state or the pre-congestion state in the target port. The target data flow is a data flow that corresponds to the target address range and whose priority corresponds to an identifier of the egress port queue.

Optionally, the storage unit 1340 is configured to store the information of the network device to which the target port belongs and the information of the target port. The storage unit 1340 is further configured to store a state of the target port.

Figure 14:
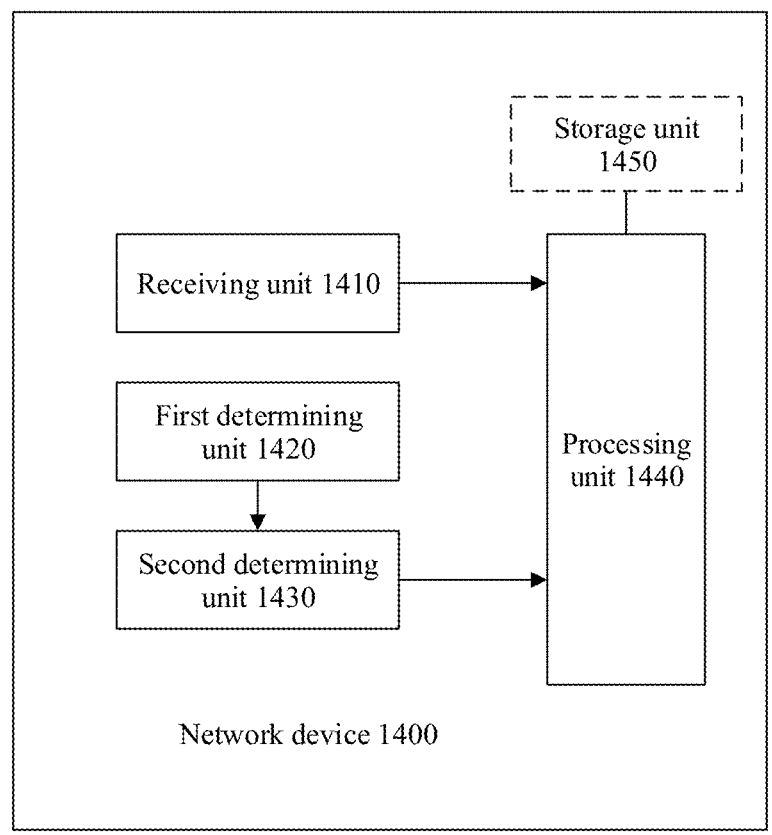
FIG. 14 is a schematic structural diagram of another network device according to an embodiment of this application.

Further, an embodiment of this application provides a network device 1400. The network device 1400 may be any network device in FIG. 1 or FIG. 2. As shown in FIG. 14, the network device 1400 includes a receiving unit 1410, a first determining unit 1420, a second determining unit 1430, and a processing unit 1440. Optionally, the network device 1400 further includes a storage unit 1450. The network device 1400 is configured to implement a function of the second network device in FIG. 3.

The receiving unit 1410 is configured to receive a first notification from a first network device. The first notification includes information of a network device to which a target port belongs and information of the target port. The target port is a port that is in a pre-congestion state or a congestion state. The second network device is a network device capable of sending, through at least two forwarding paths, a data flow to a host corresponding to the target port. The first determining unit 1420 is configured to determine a target data flow, where a first forwarding path of the target data flow includes the target port. The second determining unit 1430 is configured to determine whether an idle egress port capable of forwarding the target data flow exists on the second network device, and to obtain a result of the determination. The processing unit 1440 is configured to process the target data flow based on the result of the determination.

Optionally, when an idle egress port capable of forwarding the target flow exists on the network device, the processing unit 1430 sends the target data flow through the idle egress port. A second forwarding path on which the idle egress port is located does not include the target port.

Optionally, when no idle egress port capable of forwarding the target data flow exists on the network device, the processing unit 1430 forwards the target data flow through the first forwarding path.

Optionally, the processing unit 1440 is further configured to: generate a second notification, where the second notification includes the information of the network device to which the target port belongs and the information of the target port; and send the second notification to at least one third network device, where the at least one third network device is capable of sending, through at least two forwarding paths, a data flow to a host corresponding to the target port.

Optionally, the processing unit 1440 is further configured to send a backpressure message to a source host of the target data flow. The backpressure message is used to enable the source host to perform an operation of handling network congestion.

Optionally, the first determining unit 1420 is configured to: determine a target address range based on the information of the network device to which the target port belongs and the information of the target port, where the target address range is an address range corresponding to the host corresponding to the target port; and determine a data flow whose destination address belongs to the target address range as the target data flow.

Optionally, the first notification further includes an identifier of a target egress port queue, and the target egress port queue is an egress port queue that is in the pre-congestion state or the congestion state in the target port. The first determining unit 1420 is further configured to determine, as the target data flow, a data flow whose destination address belongs to the target address range and whose priority corresponds to an identifier of the egress port queue.

Optionally, the storage unit 1450 is configured to store the information of the network device to which the target port belongs and the information of the target port. The storage unit 1450 is further configured to store a state of the target port.

The network devices in FIG. 13 and FIG. 14 cooperate with each other, so that the method shown in FIG. 3 can be implemented, to alleviate network congestion and implement load balancing of an entire network.

Figure 15:
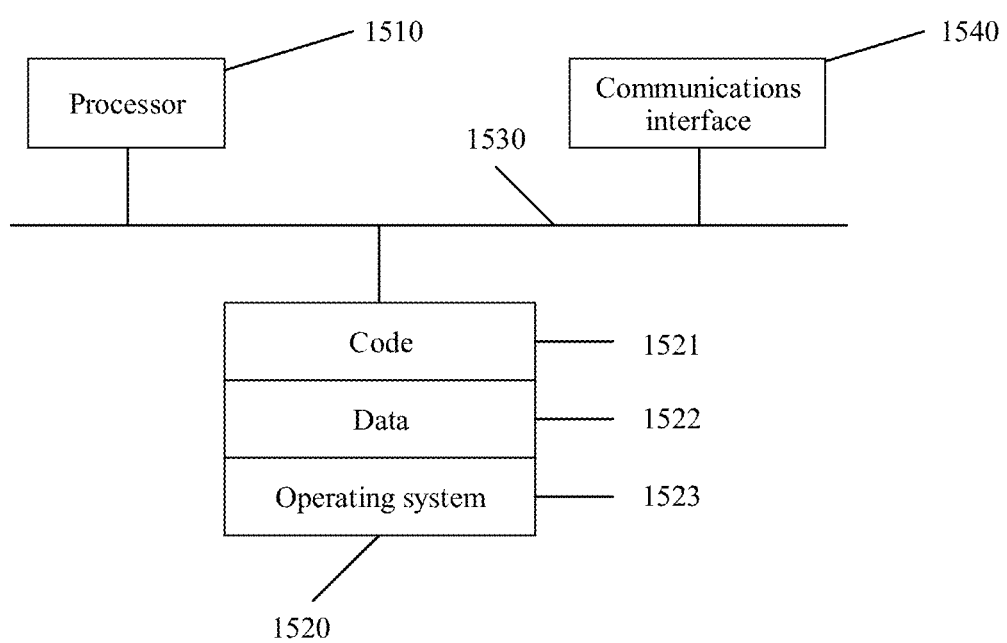
FIG. 15 is a schematic structural diagram of still another network device according to an embodiment of this application.

Further, the network devices in FIG. 13 and FIG. 14 may be implemented by a network device 1500 shown in FIG. 15. The network device 1500 may include a processor 1510, a memory 1520, and a bus system 1530. The processor 1510 is connected to the memory 1520 through the bus system 1530. The memory 1520 is configured to store program code, and the processor 1510 is configured to execute the program code stored in the memory 1520. For example, the processor 1510 may invoke the program code stored in the memory 1520, to perform the network congestion handling method in the embodiments of this application. In an embodiment of this application, the processor 1510 may be a central processing unit (CPU). The processor 1510 may alternatively be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like. The processor 1510 may include one or more processing cores. The memory 1520 may include a read-only memory (ROM) device or a random access memory (RAM) device. Any other suitable type of storage device may alternatively be used as the memory 1520. The memory 1520 may include data 1522 accessed by the processor 1510 through the bus system 1530. The memory 1520 may further include an operating system 1523 to support operation of the network device 1500. The bus system 1530 may further include a power bus, a control bus, a status signal bus, and the like, in addition to a data bus. However, for clear description, various types of buses in the figure are marked as the bus system 1530. Optionally, the network device 1500 may further include one or more output devices, for example, a communications interface 1540. The network device 1500 may communicate with another device through the communications interface 1540. The communications interface 1540 may be connected to the processor 1510 through the bus system 1530. Based on the foregoing descriptions of the implementations, a person skilled in the art may clearly understand that this application may be implemented by hardware or by software in addition to a necessary general hardware platform. Based on such understanding, the technical solutions of this application may be embodied in the form of a hardware product or a software product. The hardware product may be a dedicated chip. The software product may be stored in a non-volatile storage medium (which may be a CD-ROM, a USB flash drive, a removable hard disk, or the like), and includes instructions for instructing a computer device (which may be a personal computer, a server, a network device, or the like) to perform the methods described in the embodiments of this application.

The invention claimed is:

1. A network congestion handling method, comprising:
determining, by a first network device, a target port, wherein the target port is an egress port that is in a pre-congestion state, wherein the pre-congestion state is a state in which congestion is about to occur but has not occurred; and
sending, by the first network device, a first notification to at least one second network device, wherein the at least one second network device is capable of sending, through at least two forwarding paths, a data flow to a host corresponding to the target port, and the first notification comprises information of a network device to which the target port belongs and information of the target port;
wherein the information of the network device to which the target port belongs includes a role of the network device, and the information of the target port includes an attribute of the target port, wherein the role of the network device includes one of the following: an access device, an aggregation device, or a core device, and wherein the attribute of the target port includes whether a direction in which the target port sends the data flow is uplink or downlink.

2. The method according to claim 1, wherein the network device to which the target port belongs is the first network device, and the determining, by a first network device, a target port comprises:
monitoring, by the first network device, egress ports of the first network device; and
when a buffer usage of one of the egress ports of the first network device exceeds a port buffer threshold, determining, by the first network device, that the one of the egress ports is the target port.

3. The method according to claim 1, wherein the network device to which the target port belongs is the first network device, and the determining, by a first network device, a target port comprises:
monitoring, by the first network device, egress port queues of the first network device; and
when a length of one of the egress port queues exceeds a queue buffer threshold, determining, by the first network device, that an egress port corresponding to the one of the egress port queues is the target port.

4. The method according to claim 1, wherein the network device to which the target port belongs is a third network device, and the determining, by a first network device, a target port comprises:
receiving, by the first network device, a second notification sent by the third network device, wherein the second notification comprises information of the third network device and the information of the target port; and
determining, by the first network device, the target port based on the second notification.

5. The method according to claim 1, wherein the information of the network device to which the target port belongs comprises an identifier of the network device to which the target port belongs, and the information of the target port comprises an identifier of the target port or an identifier of a forwarding path on which the target port is located.

6. The method according to claim 1, wherein before sending, by the first network device, a first notification to at least one second network device, the method further comprises:
determining that there is no idle egress port capable of forwarding a target data flow corresponding to the target port on the first network device, wherein
the target data flow is a data flow corresponding to a target address range, and the target address range is an address range corresponding to the host corresponding to the target port, and the target address range is determined based on the information of the network device to which the target port belongs and the information of the target port.

7. The method according to claim 6, wherein the information of the target port further comprises an identifier of a target egress port queue, the target egress port queue is an egress port queue that is in the pre-congestion state in the target port, and the target data flow is a data flow that corresponds to the target address range and whose priority corresponds to an identifier of the egress port queue.

8. The method according to claim 6, further comprising:
storing, by the first network device, the information of the network device to which the target port belongs and the information of the target port.

9. A network congestion handling method, comprising:
receiving, by a second network device, a first notification from a first network device, wherein the first notification comprises information of a network device to which a target port belongs and information of the target port, and the target port is a port that is in a pre-congestion state, wherein the pre-congestion state is a state in which congestion is about to occur but has not occurred; and the second network device is a network device capable of sending, through at least two forwarding paths, a data flow to a host corresponding to the target port;
determining, by the second network device, a target data flow, wherein a first forwarding path of the target data flow comprises the target port;
determining, by the second network device, whether an idle egress port capable of forwarding the target data flow is available on the network device to which the target port belongs; and
processing, by the second network device, the target data flow;
wherein the information of the network device to which the target port belongs includes a role of the network device and the information of the target port includes an attribute of the target port, wherein the role of the network device includes one of the following: an access device, an aggregation device, or a core device, and wherein the attribute of the target port includes whether a direction in which the target port sends the data flow is uplink or downlink.

10. The method according to claim 9, wherein the processing of the target data flow based on the result of the determining whether an idle egress port is available comprises:

when an idle egress port capable of forwarding the target data flow is available on the second network device, sending, by the second network device, the target data flow through the idle egress port, wherein a second forwarding path on which the idle egress port is located does not comprise the target port.

11. The method according to claim 9, wherein the processing of the target data flow based on the result of the determining whether an idle egress port is available comprises:

when no idle egress port capable of forwarding the target data flow is available on the second network device, sending, by the second network device, the target data flow through the first forwarding path.

12. The method according to claim 11, further comprising:

generating, by the second network device, a second notification, wherein the second notification comprises the information of the network device to which the target port belongs and the information of the target port; and sending, by the second network device, the second notification to at least one third network device, wherein the at least one third network device is capable of sending, through at least two forwarding paths, a data flow to the host corresponding to the target port.

13. The method according to claim 11, further comprising:

sending, by the second network device, a backpressure message to a source host of the target data flow, wherein the backpressure message is used to enable the source host to handle network congestion.

14. The method according to claim 9, wherein the determining, by the second network device, a target data flow comprises: determining, by the second network device, a target address range based on the information of the network device to which the target port belongs and the information of the target port, wherein the target address range is an address range corresponding to the host corresponding to the target port; and determining, by the second network device, a data flow whose destination address belongs to the target address range as the target data flow.

15. The method according to claim 14, wherein the first notification further comprises an identifier of a target egress port queue, and the target egress port queue is an egress port queue that is in the pre-congestion state or the congestion state in the target port; and the determining, by the second network device, a data flow whose destination address belongs to the target address range as the target data flow comprises:
determining, by the second network device as the target data flow, a data flow whose destination address belongs to the target address range and whose priority corresponds to the identifier of the egress port queue.

16. The method according to claim 9, wherein before determining, by the second network device, a target data flow, the method further comprises:

storing, by the second network device, the information of the network device to which the target port belongs and the information of the target port.

17. A network device for handling network congestion, wherein the network device is a first network device, comprising a memory and a processor, wherein:

the memory is configured to store program code; and
the processor is configured to execute the program code to:

determine a target port, wherein the target port is an egress port that is in a pre-congestion state, wherein the pre-congestion state is a state in which congestion is about to occur but has not occurred; and send a first notification to at least one second network device, wherein the at least one second network device is capable of sending, through at least two forwarding paths, a data flow to a host corresponding to the target port, and the first notification comprises information of a network device to which the target port belongs and information of the target port;

wherein the information of the network device to which the target port belongs includes a role of the network device and the information of the target port includes an attribute of the target port, wherein the role of the network device includes one of the following: an access device, an aggregation device, or a core device, and wherein the attribute of the target port includes whether a direction in which the target port sends the data flow is uplink or downlink.

18. The network device according to claim 17, wherein the processor is configured to execute the program code to:
monitor egress ports of the first network device; and
when a buffer usage of one of the egress ports of the first network device exceeds a port buffer threshold, determine that the egress port is the target port.

19. A network device for handling network congestion, wherein the network device is a second network device, comprising a memory and a processor, wherein:

the memory is configured to store program code; and
the processor is configured to execute the program code to:

receive a first notification from a first network device, wherein the first notification comprises information of a network device to which a target port belongs and information of the target port, and the target port is a port that is in a pre-congestion state, wherein the pre-congestion state is a state in which congestion is about to occur but has not occurred; and the second network device is a network device capable of sending, through at least two forwarding paths, a data flow to a host corresponding to the target port;

determine a target data flow, wherein a first forwarding path of the target data flow comprises the target port;

determine whether an idle egress port capable of forwarding the target data flow is available on the network device to which the target port belongs; and process the target data flow;
wherein the information of the network device to which the target port belongs includes a role of the network device and the information of the target port includes an attribute of the target port, wherein the role of the network device includes one of the following: an access device, an aggregation device, or a core device, and wherein the attribute of the target port includes whether a direction in which the target port sends the data flow is uplink or downlink.

* * * * *